(12) United States Patent
Gharavi et al.

(10) Patent No.: US 10,498,428 B2
(45) Date of Patent: Dec. 3, 2019

(54) ACTIVE REPEATER DEVICE FOR OPERATIONAL MODE BASED BEAM PATTERN CHANGES FOR COMMUNICATION WITH A PLURALITY OF USER EQUIPMENT

(71) Applicant: Movandi Corporation, Newport Beach, CA (US)

(72) Inventors: Sam Gharavi, Irvine, CA (US); Ahmadreza Rofougaran, Newport Beach, CA (US); Michael Boers, South Turramurra (AU); Seunghwan Yoon, Irvine, CA (US); Kartik Sridharan, San Diego, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

(21) Appl. No.: 16/032,617

(22) Filed: Jul. 11, 2018

(65) Prior Publication Data

US 2019/0020402 A1 Jan. 17, 2019

Related U.S. Application Data

(60) Provisional application No. 62/531,161, filed on Jul. 11, 2017.

(51) Int. Cl.
*H04B 7/15* (2006.01)
*H04B 7/155* (2006.01)
(Continued)

(52) U.S. Cl.
CPC ....... *H04B 7/15514* (2013.01); *H04B 7/0413* (2013.01); *H04B 7/0617* (2013.01);
(Continued)

(58) Field of Classification Search
CPC ........................... H04B 7/0617; H04B 7/1555
(Continued)

(56) References Cited

U.S. PATENT DOCUMENTS 5,598,173 A * 1/1997 Lo Forti ................. H01Q 3/26
342/372
5,771,017 A 6/1998 Dean et al.
(Continued)

OTHER PUBLICATIONS

Notice of Allowance for U.S. Appl. No. 16/031,007 dated May 2, 2019.

(Continued)

*Primary Examiner* — Kevin M Burd
(74) *Attorney, Agent, or Firm* — Chip Law Group

(57) ABSTRACT

An active repeater device includes a primary sector and at least a secondary sector communicatively coupled to the primary sector receives or transmits a first beam of input RF signals having a first beam pattern from or to a base station, respectively. The primary sector includes an baseband signal processor and a first radio head (RH) unit. The secondary sector comprises a second RH unit. The first beam pattern covers a first geographical area. Beamforming coefficients are generated to convert the first beam pattern of the first beam of input RF signals to a second beam pattern. A second beam of output RF signals in the second beam pattern is transmitted from or received by, respectively, the secondary sector to or from, respectively, a plurality of user equipment (UEs) based on the generated beamforming coefficients and the received first beam of input RF signals.

22 Claims, 17 Drawing Sheets

(51) Int. Cl.

| | | |
|---|---|---|
| *H04B 7/204* | (2006.01) | |
| *H04B 7/165* | (2006.01) | |
| *H04B 17/318* | (2015.01) | |
| *H04B 7/0413* | (2017.01) | |
| *H04B 7/06* | (2006.01) | |
| *H04W 52/24* | (2009.01) | |
| *H04W 52/46* | (2009.01) | |
| *H04L 5/14* | (2006.01) | |
| *H04L 5/00* | (2006.01) | |

(52) U.S. Cl.
CPC .............. *H04B 7/15* (2013.01); *H04B 7/1555* (2013.01); *H04B 7/165* (2013.01); *H04B 7/2041* (2013.01); *H04B 17/318* (2015.01); *H04W 52/245* (2013.01); *H04W 52/46* (2013.01); *H04L 5/0023* (2013.01); *H04L 5/14* (2013.01)

(58) Field of Classification Search
USPC ........................................................ 375/262
See application file for complete search history.

(56) References Cited

U.S. PATENT DOCUMENTS

| | | | |
|---|---|---|---|
| 7,206,294 B2 | 4/2007 | Garahi et al. | |
| 7,424,225 B1 | 9/2008 | Elliott | |
| 7,457,641 B1* | 11/2008 | Legnain | H04W 72/1231 455/450 |
| 2002/0193074 A1 | 12/2002 | Squibbs | |
| 2003/0236109 A1 | 12/2003 | Nagata | |
| 2004/0110469 A1 | 6/2004 | Judd et al. | |
| 2005/0069252 A1 | 3/2005 | Hwang et al. | |
| 2006/0246922 A1 | 11/2006 | Gasbarro et al. | |
| 2009/0029645 A1 | 1/2009 | Leroudier | |
| 2010/0167639 A1 | 7/2010 | Ranson et al. | |
| 2010/0284446 A1* | 11/2010 | Mu | H04B 7/15521 375/211 |
| 2011/0081875 A1 | 4/2011 | Imamura et al. | |
| 2011/0142104 A1* | 6/2011 | Coldrey | H04B 7/10 375/211 |
| 2012/0131650 A1 | 5/2012 | Gutt et al. | |
| 2013/0287139 A1 | 10/2013 | Zhu et al. | |
| 2013/0343235 A1 | 12/2013 | Khan | |
| 2017/0257155 A1 | 9/2017 | Liang et al. | |
| 2018/0041270 A1* | 2/2018 | Buer | H04B 7/2041 |
| 2018/0115305 A1* | 4/2018 | Islam | H04B 7/0695 |
| 2019/0020407 A1* | 1/2019 | Gharavi | H04B 17/318 |

OTHER PUBLICATIONS

Corrected Notice of Allowance for U.S. Appl. No. 16/031,007 dated Sep. 16, 2019.

Misc Communication from USPTO for U.S. Appl. No. 16/382,386 dated Oct. 8, 2019.

Non-Final Office Action for U.S. Appl. No. 16/231,903 dated Sep. 18, 2019.

Non-Final Office Action for U.S. Appl. No. 16/294,025 dated Sep. 12, 2019.

Non-Final Office Action for U.S. Appl. No. 16/526,544 dated Sep. 18, 2019.

Notice of Allowance for U.S. Appl. No. 16/032,668 dated Sep. 20, 2019.

Notice of Allowance for U.S. Appl. No. 15/904,521 dated Sep. 20, 2019.

Notice of Allowance for U.S. Appl. No. 16/111,326 dated Oct. 10, 2019.

\* cited by examiner ed States Patent US 10,498,428 B2

ACTIVE REPEATER DEVICE FOR OPERATIONAL MODE BASED BEAM PATTERN CHANGES FOR COMMUNICATION WITH A PLURALITY OF USER EQUIPMENT

CROSS-REFERENCE TO RELATED APPLICATIONS/INCORPORATION BY REFERENCE

This application claims priority to U.S. Provisional Patent Application Ser. No. 62/531,161 filed on Jul. 11, 2017, the entire content of which is hereby incorporated herein by reference.

FIELD OF TECHNOLOGY

Certain embodiments of the disclosure relate to an active repeater device in a wireless system. More specifically, certain embodiments of the disclosure relate to an active repeater device for beam widening to communicate with a plurality of user equipment.

BACKGROUND

Wireless telecommunication has witnessed advent of various signal transmission techniques and methods, such as use of beam forming and beam steering techniques, for enhancing capacity of radio channels. A radio frequency (RF) transmitter device may be configured to radiate radio waves in form of beams of RF signals to a variety of RF receiver devices. In conventional systems, a base station may transmit RF signals to a user equipment (UE) via a pencil-beam. The pencil-beam may be highly directional, have limited coverage area, and may only support line-of-sight (LOS) communication. Therefore, the base station may be required to constantly track a location of the UE in order to provide continued communication. Further, the base station may be required to frequently steer the pencil beam to the tracked location of the UE. In conventional systems, a process of constantly tracking location of the UE may consume a large portion of communication bandwidth, which may not be desirable.

In certain scenarios, the UE may be in motion in a certain trajectory of motion. Therefore, the location of the UE may vary frequently. In such cases, it may be difficult for the base station to track the constantly varying location of the UE accurately. The base station may thus fail to steer the pencil beam frequently and accurately towards the UE. The UE may intermittently move out of the coverage area of the pencil beam and the UE may not receive the RF signals transmitted by the base station. In other scenarios, signal-obstructing physical objects or materials may partially block or impair the pencil beam of RF signals communicated between the base station and the UE. Such signal-obstructing physical objects may obstruct the pencil beam from passing through it even in the LOS transmission path. Moreover, the RF signals transmitted by the base station may bounce off the obstructing physical objects, such as tall buildings and hills, and may scatter.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An active repeater device for operational mode based beam pattern changes to communicate with a plurality of user equipment, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
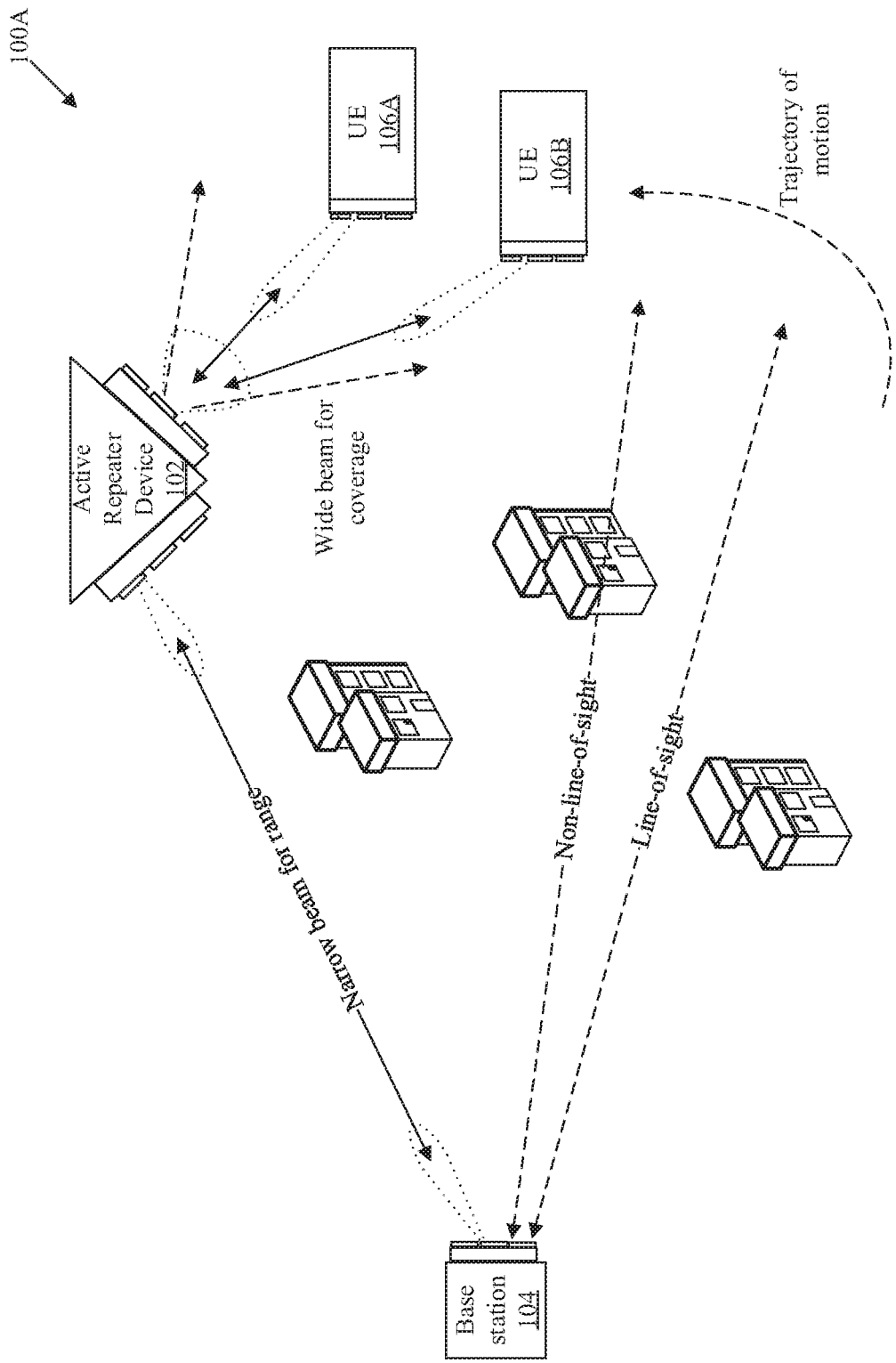
FIG. 1A is a network environment diagram that illustrates an exemplary active repeater device communicatively coupled to a base station and a plurality of user equipment, in accordance with an exemplary embodiment of the disclosure.

Certain embodiments of the disclosure may be found in an active repeater device for beam widening to communicate with a plurality of user equipment. In the following description, reference is made to the accompanying drawings, which form a part hereof, and in which is shown, by way of illustration, various embodiments of the present disclosure. Emergence of 5G networks in cm-wave and mm-wave bands is introducing new opportunities as well as new technical challenges. 5G networks may provide orders of magnitude improvement in throughput and capacity complimented by the availability of wider spectrum bands, for example, in 28/39/60 GHz frequencies (or between 28-300 GHz) and massive frequency reuse through utilization of highly directional antennas. However, deployment of 5G networks is conditioned on overcoming certain challenges, for example:

1. Higher propagation loss at high frequencies with a single antenna of size ~λ/2. This is a well understood challenge with a well-analyzed solution, where use of steerable phased arrays may overcome this challenge by building large antenna apertures through co-phasing of many small antenna elements.
2. Need for trackable line-of-sight (LOS) path or strong reflective path between transmitter and receiver. Lack of refraction and diffraction in high radio frequencies also limits availability of links to LOS path or strong mirror-like reflective paths. This may be a constraint to deliver wireless connections that are to be made available anywhere and anytime.
3. High transmittance loss through the signal-obstructing physical objects or material at high radio frequencies. The high radio frequencies, such as the cm-wave and mm-wave radio signals, demonstrate high transmittance losses when propagating through typical signal-obstructing physical objects or materials, such as tinted glass, wood, drywall, other glasses etc, when compared to sub-5 GHz radio signals. This may be a constraint to availability of connections, anywhere and anytime.

Although, the first challenge is well understood and successfully mitigated by use of large phased array antennas. However, currently, there are no widely-agreed-on and/or standard mitigation techniques to the second and the third challenges as given above. The disclosed active repeater device mitigates at least the two remaining challenges. The disclosed active repeater device significantly saves communication bandwidth by avoiding constant tracking of the location of the plurality of user equipment as a result of widened beam used to communicate with the plurality of user equipment.

In a first exemplary scenario, in conventional systems, the base station may communicate with each of the plurality of UEs based on a time division multiple access (TDMA) scheme. In accordance with the TDMA scheme, each of the plurality of UEs may be allotted with different timeslots of a plurality of available timeslots of a transmission time period. A UE of the plurality of UEs may receive the beam of RF signals exclusively during a timeslot which may be allotted to the respective UE. However, the base station may transmit the beam of RF signals to the plurality of UEs continuously throughout the transmission time period irrespective of timeslots allotted to the plurality of UEs. In such conventional systems, the base station may waste power by transmitting the beam of RF signals to the UE at timeslots which may not be allotted for the UE. In contrast to such conventional systems, the disclosed active repeater device also saves power by avoiding transmission of RF signals to UEs at timeslots which may not be assigned to the respective UEs in accordance with a particular TDMA based signal transmission scheme used by the base station.

In a second exemplary scenario, a radio frequency (RF) transmitter device may be configured to radiate radio waves in form of beams of RF signals to a plurality of RF receiver devices. In certain cases, the plurality of UEs may be scattered within a geographical area which may be significantly larger than the coverage area that may be covered by one beam of RF signals. In such cases, one or more UEs, which may be located outside the coverage area of the beam of RF signals may fail to receive the beam of RF signals. In such cases, the disclosed active repeater device significantly increases transmission range by concurrent multi-beam transmission with the plurality of UEs. Thus, the disclosed active repeater device not only mitigates the two remaining challenges as discussed above, but also can re-configure its beamforming engine resources within the active repeater device to support various new operating modes, such as a static beam mode, a beam widening mode, a switching multi-beam mode, a concurrent multi-beam mode, or one or more specified combination of the static beam mode, the beam widening mode, the switching multi-beam mode, the concurrent multi-beam mode. Such re-configuration may be applied at installation time or at runtime (i.e, during operation of the active repeater device). In the following description, reference is made to the accompanying drawings, which form a part hereof, and in which is shown, by way of illustration, various embodiments of the present disclosure.

FIG. 1A is a network environment diagram that illustrates an exemplary active repeater device in communication with a base station and a plurality of user equipment, in accordance with an exemplary embodiment of the disclosure. With reference to FIG. 1, there is shown a network environment 100A that may include an active repeater device 102, a base station 104 and a plurality of user equipment (UEs) 106A and UE 106B. The base station 104 may be located at a certain distance from the UE 106A and the UE 106B. The plurality of UEs 106A and 106B may be in movement in accordance with a certain trajectory of motion. The active repeater device 102 may be installed at a defined location and may be stationary.

The active repeater device 102 may have a modular architecture that includes a primary sector and one or more secondary sectors. The primary sector may include a baseband signal processor and a first radio head (RH) unit. Each of the one or more secondary sectors may include a second RH unit. The baseband signal processor may also be referred to as a light baseband unit (LBU) or a simplified baseband unit (BBU) that may be smaller in size as compared to a conventional BBU to be housed in the primary sector of the active repeater device 102. Each of the one or more secondary sectors may be communicatively coupled to the primary sector via one or more analog baseband (IQ) signal cables and a control signal cable. The primary sector and one or more secondary sectors including the at least one secondary sector may be configured to cover a portion of a 360-degree scan range for communication among the base station 104, the plurality of UEs 106A and 106B, or another active repeater device, after installation at the defined location. In accordance with an embodiment, the active repeater device 102 may support multiple and a wide range of frequency spectrum, for example, 1G, 2G, 3G, 4G, and 5G. Alternatively stated, the active repeater device 102 may facilitate communication in both sub 30 gigahertz to above 30 gigahertz. The band of radio frequencies in the electromagnetic spectrum from 30 to 300 gigahertz is usually referred to as extremely high frequency (EHF) communication. Such radio frequencies have wavelengths from ten to one millimeter, referred to as millimeter wave (mmW).

The active repeater device 102 may comprise a plurality of RH units including the first RH unit in the primary sector, and the second RH unit in the secondary sector. Each of the plurality of RH units may comprise a first antenna array and a second antenna array. Therefore, the active repeater device 102 may comprise a plurality of first antenna arrays and a plurality of second antenna arrays. Each of the plurality of first antenna arrays may be configured to receive beams of input RF signals from one or more signal transmitters, such as transmitters in the base station 104, the plurality of UEs 106A and 106B, and other active repeater devices. Each of the plurality of second antenna arrays may be configured to transmit beams of output RF signals to one or more signal receivers, such as receivers in the base station 104, the plurality of UEs 106A and 106B, and other active repeater devices. In accordance with an embodiment, the plurality of first antenna arrays may be configured to receive different input RF signals from the plurality of UEs 106A and 106B through different beam patterns and distances.

In certain scenarios, the active repeater device 102 may be positioned in a vicinity of a signal obstructing object, such as a tall building which may partially block the path of the input RF signals. The active repeater device 102 may be realized by various components, such as transmitter frontends, receiver front-ends, a plurality of low-noise amplifiers, a plurality of phase shifters, a plurality of power combiners, a plurality of power dividers, and a plurality of power amplifiers, logical control units, controllers and mixers.

The base station 104, for example, an Evolved Node B (eNB) or gNB, may be a fixed point of communication that may relay information, in form of a plurality of beams of RF signals, to and from communication devices, such as the active repeater device 102 and the plurality of UEs 106A and 106B. Multiple base stations corresponding to one service provider, may be geographically positioned to cover specific geographical areas. Typically, bandwidth requirements serve as a guideline for a location of the base station 104 based on relative distance between the plurality of UEs 106A and 106B and the base station 104. The count of base stations depends on population density and geographic irregularities, such as buildings and mountain ranges, which may interfere with the plurality of beams of RF signals.

The base station 104 may be configured to transmit a first beam of input RF signals to the active repeater device 102. In one example, the first beam having a first beam pattern, such as a narrow beam, may be received by the active repeater device 102. The base station 104 may be configured to generate the narrow beam of the input RF signals to achieve a high transmission range so that the narrow beam of the input RF signals reaches the known location of the active repeater device 102. Since the active repeater device 102 may be stationary at the defined location, the base station 104 may not need to track location of the active repeater device 102 periodically or constantly.

Each of the plurality of UEs 106A and 106B may correspond to a telecommunication hardware used by an end-user to communicate. Alternatively stated, the plurality of UEs 106A and 106B may refer to a combination of mobile equipment and subscriber identity module (SIM). Each of the plurality of UEs 106A and 106B may be configured to communicate with the active repeater device 102 by use of RF signals. In some embodiments, each of the plurality of UEs 106A and 106B may be a telecommunication hardware (e.g., a customer-premises equipment (CPE)) present at the premises of a subscriber and communicatively coupled to a carrier's telecommunication channel at certain interface point. The interface point is usually situated established in a building to separate the CPE from the equipment located in either the distribution infrastructure or central office of the communications service provider. Other examples of the plurality of UEs 106A and 106B may include, but are not limited to a smartphone, a wireless modem, a home router, a cable or satellite television set-top box, a VoIP base station, or any other customized hardware for telecommunication. The active repeater device 102 may be deployed between the base station 104 (e.g. an eNB) and the plurality of UEs 106A and 106B to mitigate lack of line-of-sight (LOS) between the base station 104 and the plurality of UEs 106A and 106B.

In operation, at least one operating mode of a plurality of operating modes may be set in the active repeater device 102. The plurality of operating modes includes a beam widening mode, a switching multi-beam mode, a concurrent multi-beam mode, and a static beam mode, or an operating mode that includes one or more specified combination of the static beam mode, the beam widening mode, the switching multi-beam mode, and the concurrent multi-beam mode. For example, an operating mode may be a combination of the beam widening mode and the switching multi-beam mode, where the beams that are switched are wider beams in comparison to the beam received from the base station 104. The selection may be made by at least one of a control command received from a control server (or the base station 104) from a remote location that may be different than an installation location of the active repeater device, a user-input to change a configuration setting at the active repeater device, or an automatic estimation of a number, distances, and a spatial distribution of the plurality of UEs 106A and 106B, to be serviced. Certain operations of a first operating mode, for example, the beam widening mode of the plurality of operating modes, are described with respect to FIG. 1A. The switching multi-beam mode is discussed, for example, in FIGS. 1B, 1C, and 1D. The concurrent multi-beam mode is discussed, for example, also in FIGS. 1B, 1E, and 1F. The plurality of operating modes and their operations are discussed, for example, in FIGS. 6A, 6B, 7A, 7B, and 7C.

In FIG. 1A, in a case where the beam widening mode is set, the active repeater device 102 may be configured to receive a first beam of input RF signals having a first beam pattern. The first beam may be received by the active repeater device 102 from the base station 104. The first beam of input RF signals having the first beam pattern may corresponds to a narrow beam, such as a pencil beam, which may cover a first geographical area. The base station 104 may be configured to detect a location of the active repeater device 102 and then direct the narrow beam towards the detected location of the active repeater device 102. Since the active repeater device 102 and the base station 104 may be stationary, the base station 104 may be configured to transmit the narrow beam to the active repeater device 102 without constant tracking of location of the active repeater device 102. The active repeater device 102 may be configured to receive the first beam via a first antenna array comprising a first set of antenna elements. In certain scenarios, the active repeater device 102 may be configured to receive the first beam of input RF signals from another active repeater device which may be a part of a non-line-of-sight (NLOS) transmission path. The NLOS transmission path may be between the base station 104 and the plurality of UEs 106A and 106B.

The active repeater device 102 exhibits a demodulator-less architecture to avoid introduction of latency through the active repeater device 102. As a result of the demodulator-less architecture, one or more beams of output RF signals may be transmitted by one or more antenna arrays of the active repeater device 102 to the plurality of UEs 106A and 106B without demodulation of data portion of the received first beam of input RF signals to minimize the latency for transmission of the one or more beams of output RF signals while maintaining a final error vector magnitude (EVM) target at end destination point (i.e. the plurality of UEs 106A and 106B).

The active repeater device 102 may comprise a digital modem circuitry, for example, an embedded 5G modem. The digital modem circuitry may utilize the received signal (i.e. the received first beam of input RF signals) for control and monitoring operations, such as configuring and monitoring beamforming functions. However, the active repeater device 102 does not process (i.e., demodulate) data stream in the received signal intended for end destination (i.e. the plurality of UEs 106A and 106B). The data stream may also be referred to as the data portion of the received first beam of input RF signals. For example, some subcarriers in the waveform of the received signal (i.e. the received first beam of input RF signals) may be dedicated for active repeater device 102 internal consumption, while the rest of subcarriers are assigned to other end users (i.e. the plurality of UEs 106A and 106B). In this case, the digital modem circuitry selectively decodes only the subcarriers assigned for the consumption of the active repeater device 102 and the full received RF signal is still relayed towards the destination without demodulation of full waveform to achieve near-zero-latency while maintaining a final error vector magnitude (EVM) target at end destination point (i.e. the plurality of UEs 106A and 106B) without relying on demodulation or re-modulation at an intermediate point, such as the deployment location of the active repeater device 102, for boosting EVM. Although this sets a higher limit on signal-to-noise ratio (SNR) quality for signal propagation through the active repeater device 102, the active repeater device 102 still achieves target final RX SNR (i.e. signal quality at the plurality of UEs 106A and 106B is greater than a defined threshold SNR, for example, ~22 dB). Conventional active repeaters are simply digital signal amplifiers, which may decode both the header portion and the data portion for amplification, which adds to latency in communication. The active repeater device 102 is configured to only decode the header potion of the received signal to extract control information without demodulation of the data portion of the first set of coded data signals to achieve near-zero-latency. Further, a conventional baseband unit (BBU) is voluminous, and is typically placed in an equipment room in mobile telecommunications systems and connected with remote radio head unit (RRU), via optical fiber. In contrast, a baseband signal processor of the primary sector of the active repeater device 102 may be implemented as the baseband signal processor card or chip, which is smaller in size and consumes less power in comparison with the conventional BBU. Thus, the baseband signal processor of the primary sector may also be referred to as a light baseband unit (LBU) or a simplified baseband unit (BBU) that may be smaller in size as compared to a conventional BBU.

In accordance with an embodiment, the active repeater device 102 may be configured to generate a first set of analogue baseband (IQ) signals based on the received first beam of input RF signals. The first set of IQ signals may comprise signals which may be processed in accordance with a defined or particular phase modulation scheme. An example of the phase modulation scheme may include, but is not limited to a Quadrature Phase Shift Keying (QPSK) based modulation scheme and a Quadrature Amplitude modulation (QAM) scheme. The active repeater device 102 may be configured to convert the received first set of IQ signals to a first set of coded data signals. The first set of coded data signals may comprise a plurality of data packets, arranged as a sequence of frames. Each of the sequence of frames may comprise a header portion and a data portion. The sequence of frames may comprise data frames provided in the data portion and control frames provided in the header portion. The active repeater device 102 may be configured to decode the header portion of the first set of coded signals. The active repeater device 102 may be configured to extract control information from the first set of coded data signals based on the header portion of the first set of coded data signals. In accordance with an embodiment, the extracted control information may include Time Division Duplex (TDD) time slot information and beamforming information. The beamforming information may include beam training information between the base station 104 and the plurality of UEs 106A and 106B. The control information may further include frame structure and frame length information of the first set of coded data signals accessed from the header portion of the first set of coded data signals.

In accordance with an embodiment, the active repeater device 102 may be configured to receive a plurality of RF signals from the plurality of UEs 106A and 106B. The active repeater device 102 may be configured to measure Received Signal Strength Indicator (RSSI) associated with each of the plurality of RF signals received from the plurality of UEs 106A and 106B. The active repeater device 102 may be configured to estimate a relative position of each of the plurality of UEs 106A and 106B with respect to the active repeater device 102. The active repeater device 102 may not be required to constantly or too frequently (such as less than a specified time period) measure the RSSI associated with each of the plurality of RF signals received from the plurality of UEs 106A and 106B.

In accordance with an embodiment, the active repeater device 102 may be configured to generate beamforming coefficients to convert the first beam pattern of the first beam to a second beam pattern based on the extracted control information and the measured RSSI. The beamforming coefficients may be generated based on the measured RSSI and the estimated relative positions of each of the plurality of UEs 106A and 106B from the active repeater device 102. A second beam having the second beam pattern may cover a second geographical area. The second beam pattern may be wider than the first beam pattern. Further, the second geographical area may be larger than the first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B without requiring to constantly track locations of each of the plurality of UEs 106A and 106B. The pencil-beams may have higher transmission range but provides less coverage as compared to the widened beam that have comparatively lesser transmission range but provide greater coverage.

In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B. Therefore, transmission of the second beam of output RF signals in the second beam pattern to the plurality of UEs 106A and 106B may be independent of or devoid of constant tracking of locations and orientations of the plurality of UEs 106A and 106B to save communication bandwidth and power.

In accordance with an embodiment, the active repeater device 102 may be configured to generate output RF signals based on the first set of IQ signals. Further, the active repeater device 102 may be configured to generate the second beam of the second beam pattern based on the generated beamforming coefficients. Further, the active repeater device 102 may be configured to transmit the generated output RF signals in the second beam pattern to the plurality of UEs 106A and 106B based on the generated beamforming coefficients and the received first beam of input RF signals. The active repeater device 102 may be configured to transmit the second beam via at least a second antenna array among the plurality of second antenna arrays in the secondary sectors. The transmission of the second beam of output RF signals in the second beam pattern to the plurality of UEs 106A and 106B may be done without (or independent of) constant tracking of locations and orientations of the plurality of UEs 106A and 106B to save communication bandwidth.

The active repeater device 102 may establish the MIMO communication in a non-line-of-sight (NLOS) transmission path based on the receipt of the first beam of input RF signals having the first beam pattern from the base station 104. Further, the active repeater device 102 may be configured to establish the MIMO communication based on transmission of the second beam of output RF signals in the second beam pattern to the plurality of UEs 106A and 106B.

Figure 1B:
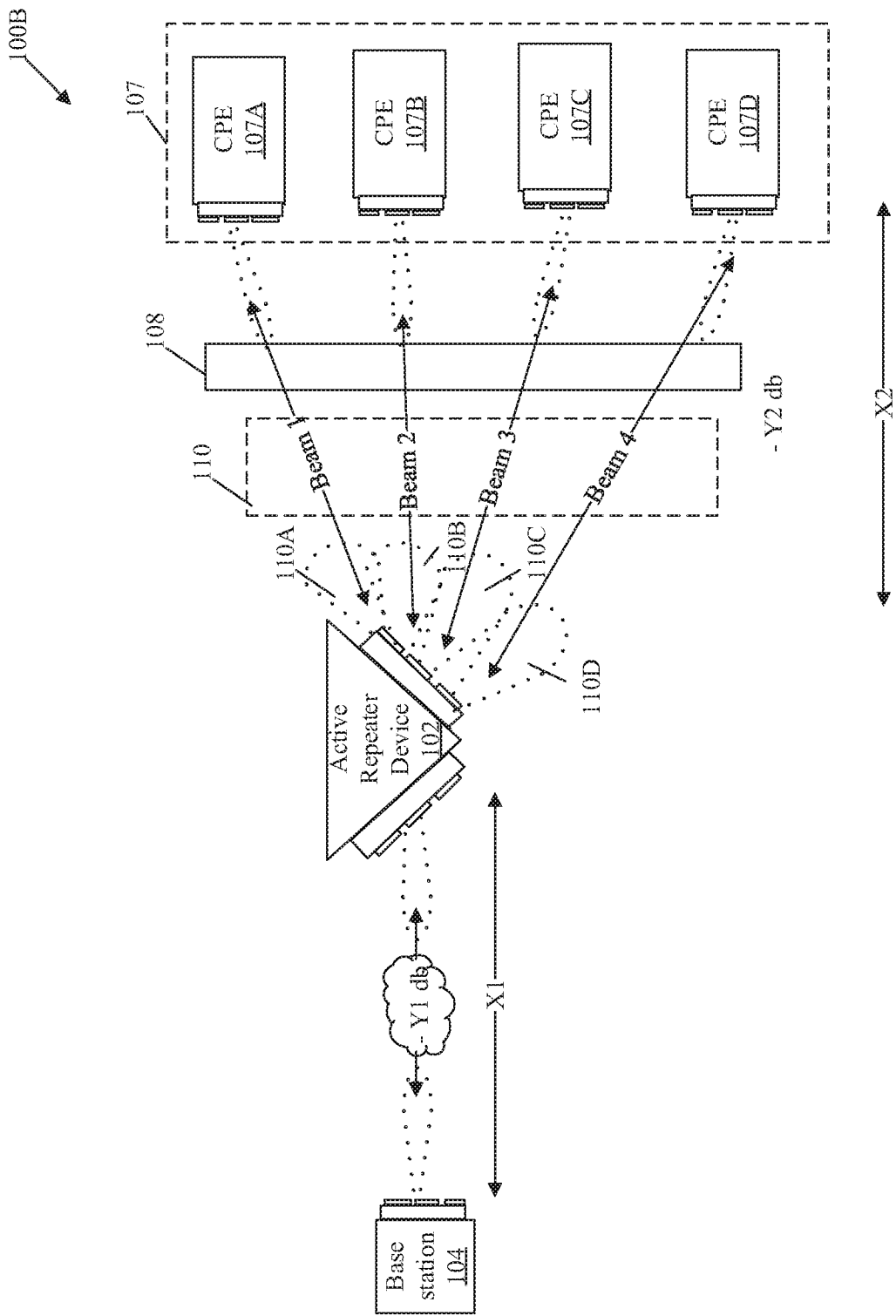
FIG. 1B is another network environment diagram that illustrates the active repeater device of FIG. 1A in communication with a base station and a plurality of customer premises equipment, in accordance with an exemplary embodiment of the disclosure.

FIG. 1B is a network environment diagram that illustrates the active repeater device of FIG. 1A in communication with a base station and a plurality of customer premises equipment, in accordance with an exemplary embodiment of the disclosure. With reference to FIG. 1B, there is shown a network environment 100B that may include the active repeater device 102, the base station 104 and a plurality of customer premises equipment (CPEs) 107 (such as a first CPE 107A, a second CPE 107B, a third CPE 107C and a fourth CPE 107D). The plurality of CPEs 107 may correspond to the plurality of UEs of FIG. 1A. The base station 104 may be located at a certain distance from each CPE of the plurality of CPEs 107. The active repeater device 102 may be installed at a defined location and may be stationary. There is also shown a signal-obstructing physical object 108 that may partially block or impair a plurality of beams 110 (such as a first beam 110A, a second beam 110B, a third beam 110C, and a fourth beam 110D) of output RF signals communicated between the active repeater device 102 and the plurality of CPEs 107.

Each of the plurality of CPEs 107 may correspond to a telecommunication hardware present at the premises of a subscriber and communicatively coupled to a carrier's telecommunication channel at certain interface point. The interface point is usually situated or established in a building to separate the CPE from the equipment located in either the distribution infrastructure or central office of the communications service provider. The CPE may also be alternatively referred to as user equipment, such as the plurality of UEs 106A and 106B, such as a combination of mobile equipment and subscriber identity module (SIM), used by an end-user to communicate. Each of the plurality of CPEs 107 may be configured to communicate with the active repeater device 102 by use of RF signals. Examples of the plurality of CPEs 107 may include, but are not limited to a wireless modem, a home router, a fixed mobile convergence hardware, a telecommunication gateway device, a cable or satellite television set-top box, a VoIP base station, or any other customized hardware for telecommunication. The active repeater device 102 may be deployed between the base station 104 (e.g. an eNB) and the plurality of CPEs 107 to mitigate lack of line-of-sight (LOS) between the base station 104 and the plurality of CPEs 107.

In operation, the active repeater device 102 may be configured to receive a first beam of input RF signals having a first beam pattern. The first beam may be received by the active repeater device 102 from the base station 104. The first beam of input RF signals having the first beam pattern may correspond to a narrow beam such as a pencil beam which may cover a first geographical area. Since the active repeater device 102 and the base station 104 may be stationary, the base station 104 may be configured to direct the narrow beam to the active repeater device 102 without constant tracking of location of the active repeater device 102.

The active repeater device 102 may be configured to receive the first beam via a first antenna array comprising a first set of antenna elements. In certain scenarios, the active repeater device 102 may be configured to receive the first beam of input RF signals from another active repeater device which may be a part of a non-line-of-sight (NLOS) transmission path. The NLOS transmission path may be between the base station 104 and the plurality of CPEs 107. The active repeater device 102 exhibits a demodulator-less architecture to avoid introduction of latency through the active repeater device 102. As a result of the demodulator-less architecture, one or more beams of output RF signals may be transmitted by one or more antenna arrays of the active repeater device 102 to the plurality of CPEs 107 without demodulation of data portion of the received first beam of input RF signals to minimize the latency for transmission of the one or more beams of output RF signals while maintaining a final error vector magnitude (EVM) target at end destination point (i.e. the plurality of CPEs 107).

The first beam of input RF signals may comprise input RF signals intended for each of the plurality of CPEs 107. For example, the first beam of the input RF signals may comprise a first input RF signal intended for the first CPE 107A. The first beam of the input RF signals may further comprise a second input RF signal, a third input RF signal, and a fourth RF input signal, intended for the second CPE 107B, the third CPE 107C, and the fourth CPE 107D respectively. The first beam of input RF signals may comprise a single stream which may have been generated by a superimposition of the first input RF signal, the second input RF signal, the third RF input RF signal, and the fourth input RF signal by the base station 104. The first input RF signal, the second input RF signal, the third RF input RF signal, and the fourth input RF signal may have been superimposed by the base station 104 in accordance with a Time Division Multiple Access (TDMA) or an Orthogonal Frequency Multiple Access (OFDMA) scheme. In accordance with an embodiment, the first beam of the received first beam of input RF signals may comprise a single reference stream comprising scheduling information associated with the TDMA based wireless signal transmission scheme. The base station 104 may be configured to communicate with the plurality of CPEs 107 via the active repeater device 102, based on the TDMA based wireless signal transmission scheme. The base station 104 may be configured to communicate with each of the plurality of CPEs 107 at a different timeslot of a plurality of timeslots in a transmission time period, based on the TDMA based wireless signal transmission system.

In accordance with an embodiment, the active repeater device 102 may be configured to generate a first set of analogue baseband (IQ) signals based on the received first beam of input RF signals. The first set of IQ signals may comprise signals which may be processed in accordance with a defined or particular phase modulation scheme. An example of the phase modulation scheme may include, but is not limited to a Quadrature Phase Shift Keying (QPSK) based modulation scheme and a Quadrature Amplitude modulation (QAM) scheme. The active repeater device 102 may be configured to convert the received first set of IQ signals to a first set of coded data signals.

The first set of coded data signals may comprise a plurality of data packets, arranged as a sequence of frames. Each of the sequence of frames may comprise a header portion and a data portion. The sequence of frames may comprise data frames provided in the data portion and control frames provided in the header portion. The active repeater device 102 may be configured to decode only the header portion of the first set of coded signals without demodulation of data stream in the received signal intended for end destination (i.e. the plurality of CPEs 107). The active repeater device 102 may be configured to extract control information from the first set of coded data signals based on the header portion of the first set of coded data signals. In accordance with an embodiment, the extracted control information may include Time Division Duplex (TDD) time slot information and beamforming information. The control information may further include frame structure and frame length information of the first set of coded data signals accessed from the header portion of the first set of coded data signals.

In accordance with an embodiment, the active repeater device 102 may be configured to receive a plurality of RF signals from each of the plurality of CPEs 107. The active repeater device 102 may be configured to measure Received Signal Strength Indicator (RSSI) associated with each of the plurality of RF signals received from the plurality of CPEs 107. The active repeater device 102 may be configured to estimate a location of each of the plurality of CPEs 107 with respect to the active repeater device 102. The active repeater device 102 may be further configured to estimate a distance of each of the plurality of CPEs 107 based on the measured RSSI. The active repeater device 102 may not be required to constantly or too frequently (such as less than a specified time period) measure the RSSI associated with each of the plurality of RF signals received from the plurality of CPEs 107. The measured RSSI associated with the plurality of CPEs 107, in combination with the location or a distance of each of the plurality of CPEs 107 from the active repeater device 102, may be also referred to as one or more signal parameters associated with the plurality of CPEs 107.

In a case where the switching multi-beam mode is selected, the active repeater device 102 may be configured to process the single reference stream of the first beam of input RF signals to extract the scheduling information associated with the TDMA based wireless signal transmission system. The active repeater device 102 may be configured to assign a different timeslot from a plurality of available timeslots to each of the plurality of CPEs 107, based on the scheduling information extracted from the received first beam of input RF signals. The plurality of available timeslots may comprise a first timeslot Ts1, a second timeslot Ts2, a third timeslot Ts3, and a fourth time slot Ts4. For example, the first timeslot Ts1, the second timeslot Ts2, the third timeslot Ts3, and the fourth time slot Ts4 may be assigned to the first CPE 107A, the second CPE 107B, the third CPE 107C, and the fourth CPE 107D respectively. Assignment of the plurality of timeslots to the plurality of CPEs 107 has been discussed in detail, for example, in FIGS. 1C and 1D. Each CPE of the plurality of CPE 107 may be configured to communicate with the active repeater device 102 exclusively or only during a corresponding timeslot assigned to the respective CPE, and may not communicate with the active repeater device 102 at other timeslots.

In the plurality of operating modes, such as the switching multi-beam mode, the concurrent multi-beam mode, the beam widening mode, or their combination, the active repeater device 102 may be configured to store a database comprising a plurality of beam settings. Each of the plurality of beam settings may correspond to a different beam profile of a plurality of different beams which may be generated by a second antenna array of a second RH unit of the active repeater device 102. However, timing of the generation and communication of the beams, shape of a beam or beam pattern, direction of beam, length of beam, may depend on the selected (or set) operating mode of the plurality of operating mode, and the distribution of the UEs or CPEs to be serviced. Each of the plurality of beam settings comprises a set of beamforming coefficients. In accordance with an embodiment, the active repeater device 102 may be configured to assign a different beam setting from the plurality of beam settings to each of the plurality of CPEs 107, based on the one or more signal parameters associated with the plurality of CPEs 107. For example, a first beam setting, a second beam setting, a third beam setting, and a fourth beam setting of the plurality of beam settings, may be assigned to the first CPE 107A, the second CPE 107B, the third CPE 107C, and the fourth CPE 107D of the plurality of CPEs 107 respectively.

In accordance with an embodiment, the active repeater device 102 may be configured to generate output RF signals based on the first set of IQ signals. Further, the active repeater device 102 may be configured to generate a plurality of beams 110 which may correspond to the plurality of beam settings, based on the assignment of the plurality of beam setting to the plurality of CPEs 107. The generated plurality of beams 110 of output RF signals may comprise the first beam 110A, the second beam 110B, the third beam 110C, and the fourth beam 110D of output RF signals. The first beam 110A, the second beam 110B, the third beam 110C and the fourth beam 110D of output RF signals may be generated based on the first beam setting, the second beam setting, the third beam setting and the fourth beam setting respectively.

If the set operating mode is the switching multi-beam mode, a second antenna array of the plurality of second antenna arrays of the second RH unit may be configured to transmit the plurality of beams 110 of output RF signals to the plurality of CPEs 107 by switching the plurality of beams 110 of output RF signals. The second antenna array may be configured to switch the plurality of beams 110 based on the assigned different timeslot and the assigned different beam setting to each of the plurality of CPEs 107. In accordance with an embodiment, the second antenna array of the second RH unit may be configured to transmit the first beam 110A of output RF signals to the first CPE 107A of the plurality of CPEs 107, exclusively during the first timeslot Ts1 assigned to the first CPE 107A, based the first beam setting assigned to the first CPE 107A, and based on the received first beam of input RF signals. Similarly, the second beam 110B, the third beam 110C and the fourth beam 110D of output RF signals may be transmitted exclusively to the second CPE 107B, the third CPE 107C, and the fourth CPE 107D respectively at the second timeslot Ts2, the third timeslot Ts3, and the fourth timeslot Ts4 respectively. Therefore, the active repeater device 102 may be configured to transmit a beam of output RF signals to a CPE of the plurality of CPEs 107 exclusively at a timeslot allotted to the respective CPE.

The switching of the plurality of beams 110 based on the assigned different timeslot and the assigned different beam setting may reduce power wastage by the active repeater device 102. As the active repeater device 102 may not transmit beams of output RF signals to CPEs of the plurality of CPEs 107, at timeslots which may not be assigned to the respective CPE, the active repeater device 102 may reduce the power wastage. Further, each beam of the plurality of beams 110, which may have been assigned to the plurality of CPEs 107, may be a narrow beam. Narrow beams may have larger transmission range in comparison to wide beams. Each beam of the plurality of beams 110 may be transmitted exclusively to a corresponding CPE of the plurality of CPEs 107. The active repeater device 102 may have larger transmission range in comparison to a conventional system (for example, a conventional base station) which may transmit a single wide beam of output RF signals to the plurality of CPEs 107.

If the set operating mode is the concurrent multi-beam mode, the active repeater device 102 may be configured to concurrently transmit the plurality of beams 110 of output RF signals to the plurality of CPEs 107. The full-bandwidth signal received from the base station 104 may be re-transmitted concurrently to the plurality of CPEs 107 over the plurality of beams 110 of output RF signals. The active repeater device 102 may be configured to concurrently transmit the plurality of beams 110 based on the assigned different beam setting to each of the plurality of CPEs 107. In one example, the plurality of beams 110 may be generated by a second antenna array of the plurality of second antenna arrays. In another example, the plurality of beams 110 may be generated by a set of second antenna arrays of the plurality of second antenna arrays. An example of a timing profile of resource block utilization in the active repeater device 102 for concurrent multi-beam transmission with the plurality of CPEs 107, is described, for example, in FIG. 1E. Further, an example of a timing profile of beams from the active repeater device 102 for concurrent multi-beam transmission with the plurality of CPEs 107, is described, for example, in FIG. 1F.

In the concurrent multi-beam mode, the active repeater device 102 may be configured to transmit each beam of the plurality of beams 110 of output RF signals exclusively to a corresponding CPE of the plurality of CPEs 107. For example, the active repeater device 102 may be configured to transmit the first beam 110A exclusively to the first CPE 107A. Similarly, the active repeater device 102 may be configured to transmit the second beam 110B, the third beam 110C, and the fourth beam 110D to the second CPE 107B, the third CPE 107C and the fourth CPE 107D respectively. A conventional active repeater device may transmit a single beam of RF signals to communicate with the plurality of CPEs 107. In certain scenarios, the plurality of CPEs 107 may be scattered within a geographical area which may be significantly larger than a coverage area that may be covered by the single beam of RF signals transmitted by the conventional active repeater device. In such cases, one or more of the plurality of CPEs 107, which may be located outside the coverage area of the single beam of RF signals may fail to receive the single beam of RF signals transmitted by the conventional active repeater device. Each of the plurality of beams 110 of output RF signals transmitted by the active repeater device 102 may be generated by the active repeater device 102 to cover a corresponding location of a CPE to which the respective beam is transmitted. Each of the plurality of beams 110 of output RF signals transmitted by the active repeater device 102 may have a transmission range which may be larger in comparison with transmission range of the single beam transmitted by the conventional active repeater device. Hence, the active repeater device 102 may have significantly larger transmission range in comparison to the conventional active repeater device.

In accordance with one embodiment, the active repeater device 102 may comprise a cascading receiver chain comprising a first set of power dividers, a first set of phase shifters, a first set of low noise amplifiers, and the first antenna array. The active repeater device 102 may comprise a cascading transmitter chain comprising a first set of power combiners, a second set of phase shifters, a first set of power amplifiers, and the second antenna array. The first antenna array may comprise a first set of antenna elements. The second antenna array may comprise a second set of antenna elements. The active repeater device 102 may be configured to partition the second set of antenna elements of the second antenna array into a plurality of spatially separated antenna sub-arrays.

The second antenna array may be configured to generate a first set of beams of output RF signals based on the partition. Each of the plurality of spatially separated antenna sub-arrays may generate one or more of the first set of beams. Further, each beam of the plurality of beams 110 may be generated by super-position of the first set of beams of output RF signals with each other. In accordance with an embodiment, a multiple-input multiple-output (MIMO) based communication may be established between the base station 104 and the plurality of UE) by the active repeater device 102. The active repeater device 102 may establish the MIMO communication in a non-line-of-sight (NLOS) transmission path based on the receipt of the first beam of input RF signals having the first beam pattern from the base station 104. Further, the active repeater device 102 may be configured to establish the MIMO communication based on transmission of the plurality of beams 110 of output RF signals to the plurality of CPEs 107.

Figure 1C:
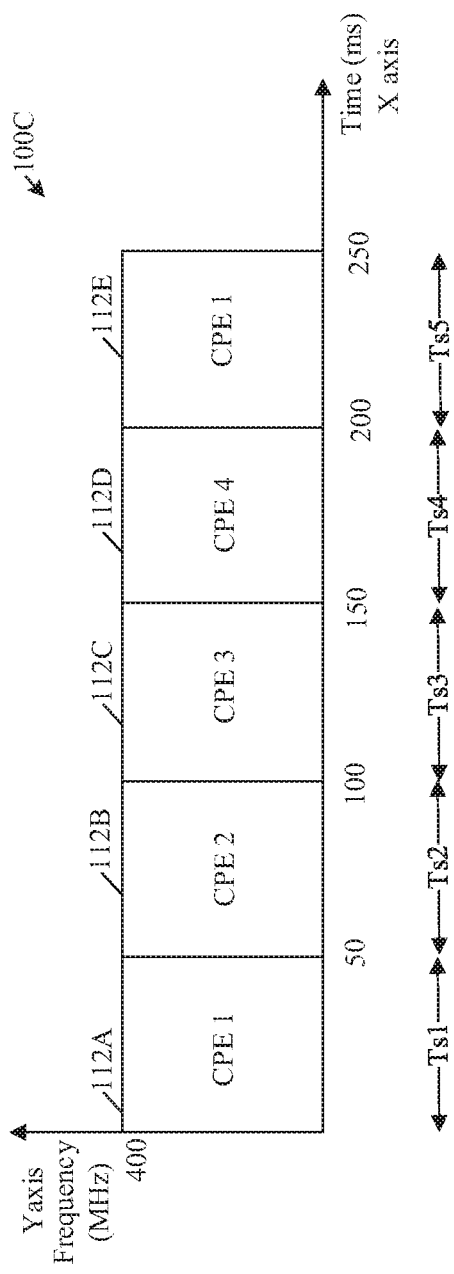
FIG. 1C illustrates a timing profile of resource block utilization of an exemplary active repeater device for switching multi-beam to communicate with a plurality of customer premises equipment (CPEs), in accordance with an exemplary embodiment of the disclosure.

FIG. 1C illustrates a timing profile of resource block utilization of an exemplary active repeater device for switching multi-beam to communicate with a plurality of customer premises equipment (CPEs), in accordance with an exemplary embodiment of the disclosure. FIG. 1C is explained in conjunction with elements from FIG. 1B. With reference to FIG. 1C, there is shown a graphical representation 100C which depicts resource block allocation to each CPE of the plurality of CPEs 107 in frequency domain, with respect to the plurality of timeslots (such as the first timeslot Ts1, the second timeslot Ts2, the third timeslot Ts3, the fourth timeslot Ts4 and the fifth timeslot Ts5) in a transmission time period as discussed in FIG. 1. Time with may be represented by the "X" axis of the graphical representation 100C, as shown. Frequency spectrum corresponding to a plurality of resource blocks allocated to each of the plurality of CPEs 107 at different timeslots (such as the first timeslot Ts1, the second timeslot Ts2, the third timeslot Ts3, the fourth timeslot Ts4 and the fifth timeslot Ts5) may be represented by the "Y" axis of the first graphical representation 100C.

The active repeater device 102 may be configured to switch the plurality of beams 110 based on the assigned different timeslot and the assigned different beam setting to each of the plurality of CPEs 107. The active repeater device 102 may be configured to allocate a first set of resource blocks to the first CPE 107A at the first timeslot Ts1 (frequency spectrum allocated to the first CPE 107A as the first set of resource blocks is represented as graph component 112A). The active repeater device 102 may be configured to allocate a second set of resource blocks to the second CPE 107B at the second timeslot Ts2 (frequency spectrum allocated to the second CPE 107B as the second of resource blocks is represented as graph component 112B).

The active repeater device 102 may be configured to allocate a third set of resource blocks to the third CPE 107C at the third timeslot Ts3 (frequency spectrum allocated to the third CPE 107C as the third set of resource blocks is represented as graph component 112C). The active repeater device 102 may be configured to allocate a fourth set of resource blocks to the fourth CPE 107D at the first timeslot Ts1 (frequency spectrum allocated as the fourth set of resource blocks is represented as graph component 112D). The active repeater device 102 may be configured to then allocate a fifth set of resource blocks to the first CPE 107A at a fifth timeslot Ts5 (frequency spectrum allocated as the fifth set of resource blocks is represented as graph component 112E), and thus the cycle may continue until all data is communicated.

Figure 1D:
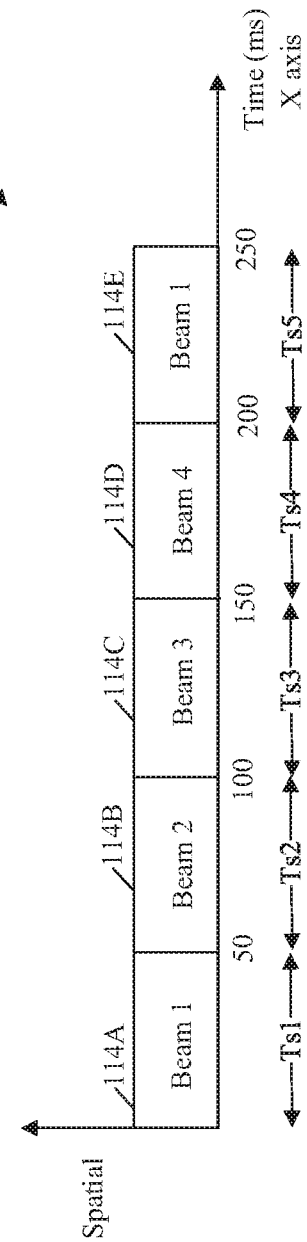
FIG. 1D illustrates a timing profile of beams of an exemplary active repeater device for switching multi-beam to communicate with a plurality of CPEs, in accordance with an exemplary embodiment of the disclosure.

FIG. 1D illustrates a timing profile of beams of an exemplary active repeater device for switching multi-beam to communicate with a plurality of CPEs, in accordance with an exemplary embodiment of the disclosure. FIG. 1D is explained in conjunction with elements from FIGS. 1B, and 1C. With reference to FIG. 1D, there is shown a graphical representation 100D which depicts beam allocation to each CPE of the plurality of CPEs 107, with respect to the plurality of timeslots (such as the first timeslot Ts1, the second timeslot Ts2, the third timeslot Ts3, the fourth timeslot Ts4 and the fifth timeslot Ts5) in the transmission time period as discussed in FIGS. 1B and 1C.

Time may be represented by the "X" axis of the graphical representation 100D, as shown. Beams allocated to each of the plurality of CPEs 107 may be represented by the "Y" axis of the graphical representation 100D. In accordance with an embodiment, the active repeater device 102 may be configured to transmit the first beam 110A (Beam 1) of output RF signals to the first CPE 107A of the plurality of CPEs 107, during the first timeslot Ts1 (as represented by graph component 114A). The active repeater device 102 may be configured to transmit the second beam 110B (Beam 2) of output RF signals to the second CPE 107B of the plurality of CPEs 107, during the second timeslot Ts2 (as represented by graph component 114B). The active repeater device 102 may be configured to transmit the third beam 110C (Beam 3) of output RF signals to the third CPE 107C of the plurality of CPEs 107, during the third timeslot Ts3 (as represented by graph component 114C). The active repeater device 102 may be configured to transmit the fourth beam 110D (beam 4) of output RF signals to the fourth CPE 107D of the plurality of CPEs 107, during the fourth timeslot Ts4 (as represented by graph component 114D). Thereafter, the active repeater device 102 may be configured to transmit the first beam 110A (Beam 1) of output RF signals to the first CPE 107A of the plurality of CPEs 107, during the fifth timeslot Ts5 (as represented by graph component 114E). Thus, as shown for example, the active repeater device 102 may be configured to transmit a beam of output RF signals to a CPE of the plurality of CPEs 107 exclusively at a timeslot allotted to the respective CPE.

The active repeater device 102 may not transmit beams of output RF signals to CPEs of the plurality of CPEs 107, at timeslots which may not be assigned to the respective CPE. Thus, the active repeater device 102 may reduce power wastage. Each beam of the plurality of beams 110, which may have been assigned to the plurality of CPEs 107, may be a narrow beam. Narrow beams may have larger transmission range in comparison to wide beams. Each beam of the plurality of beams 110 may be transmitted exclusively to a corresponding CPE of the plurality of CPEs 107. The active repeater device 102 may have larger transmission range in comparison to a conventional system (for example, a conventional base station) which may transmit a single wide beam of output RF signals to the plurality of CPEs 107.

Figure 1E:
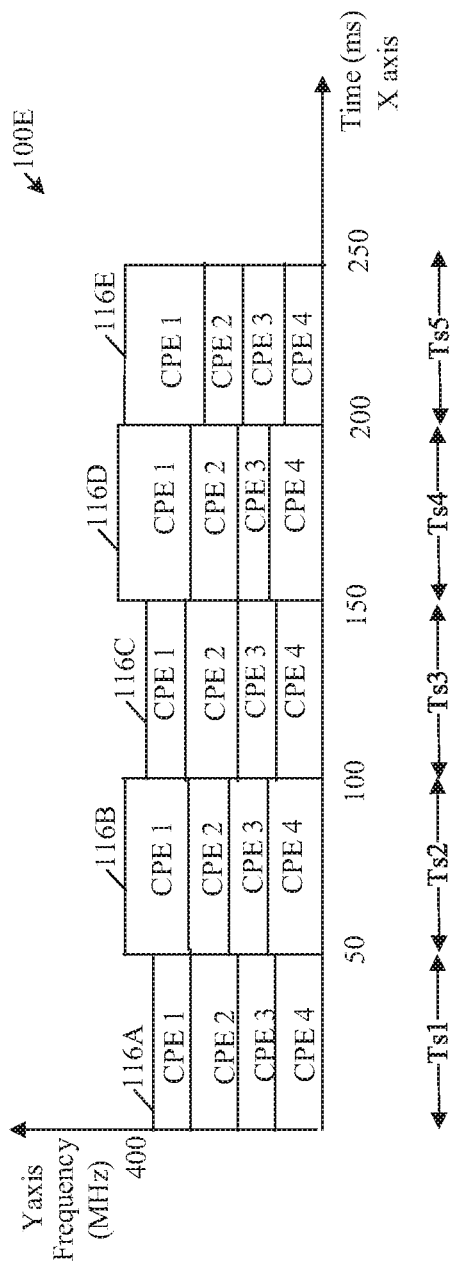
FIG. 1E illustrates a timing profile of resource block utilization of an exemplary active repeater device for concurrent multi-beam transmission with a plurality of customer premises equipment (CPEs), in accordance with an exemplary embodiment of the disclosure.

FIG. 1E illustrates a timing profile of resource block utilization of an exemplary active repeater device for concurrent multi-beam transmission with a plurality of customer premises equipment (CPEs), in accordance with an exemplary embodiment of the disclosure. With reference to FIG. 1E, there is shown a graphical representation 100E which depicts resource block allocation to each CPE (also represented as CPE 1, CPE 2, CPE 3, and CPE 4) of the plurality of CPEs 107 in frequency domain, with respect to the plurality of timeslots (such as the first timeslot Ts1, the second timeslot Ts2, the third timeslot Ts3, the fourth timeslot Ts4 and the fifth timeslot Ts5) in the transmission time period as discussed in FIG. 1B. Time with respect to may be represented by the "X" axis of the graphical representation 100E, as shown. Frequency spectrum corresponding to a plurality of resource blocks allocated to each of the plurality of CPEs 107 at different timeslots (such as the first timeslot Ts1, the second timeslot Ts2, the third timeslot Ts3, the fourth timeslot Ts4 and the fifth timeslot Ts5) may be represented by the "Y" axis of the graphical representation 100E.

The active repeater device 102 may be configured to allocate one or more of a first set of resource blocks to the plurality of CPEs 107, for the first timeslot Ts1 (frequency spectrum allocated to the plurality of CPEs 107 as the first set of resource blocks is represented as graph component 116A). The active repeater device 102 may be configured to allocate one or more of a second set of resource blocks to the plurality of CPEs 107, for the second timeslot Ts2 (frequency spectrum allocated to the plurality of CPEs 107 as the first set of resource blocks is represented as graph component 116B). The active repeater device 102 may be configured to allocate one or more of a third set of resource blocks to the plurality of CPEs 107, for the third timeslot Ts3 (frequency spectrum allocated to the plurality of CPEs 107 as the third set of resource blocks is represented as graph component 116C). The active repeater device 102 may be configured to allocate one or more of a fourth set of resource blocks to the plurality of CPEs 107, for the fourth timeslot Ts1 (frequency spectrum allocated to the plurality of CPEs 107 as the fourth set of resource blocks is represented as graph component 116D). The active repeater device 102 may be configured to allocate one or more of a fifth set of resource blocks to the plurality of CPEs 107, for the fifth timeslot Ts5 (frequency spectrum allocated to the plurality of CPEs 107 as the fifth set of resource blocks is represented as graph component 116E).

Figure 1F:
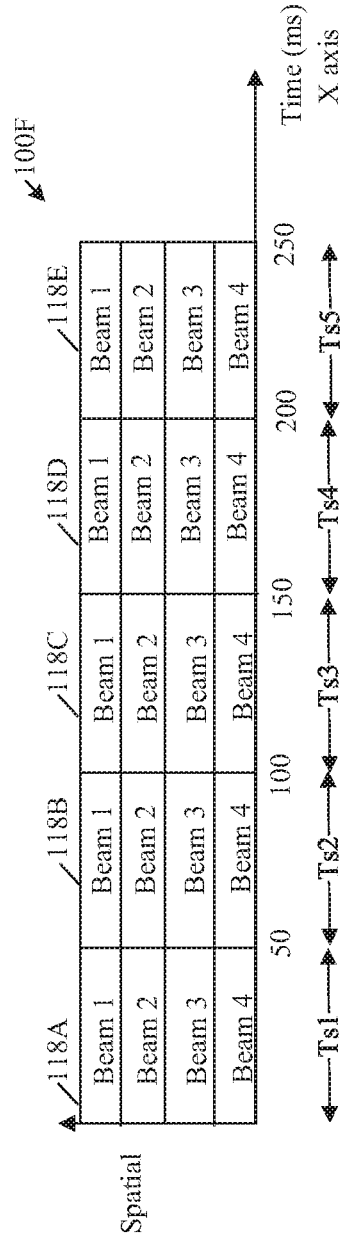
FIG. 1F illustrates a timing profile of beams of an exemplary active repeater device for concurrent multi-beam transmission to communicate with a plurality of CPEs, in accordance with an exemplary embodiment of the disclosure.

FIG. 1F illustrates a timing profile of beams of an exemplary active repeater device for concurrent multi-beam transmission to communicate with a plurality of CPEs, in accordance with an exemplary embodiment of the disclosure. With reference to FIG. 1F, there is shown a second graphical representation 100F which depicts beam allocation to each CPE (also represented as CPE 1, CPE 2, CPE 3, and CPE 4) of the plurality of CPEs 107, with respect to the plurality of available timeslots (such as the first timeslot Ts1, the second timeslot Ts2, the third timeslot Ts3, the fourth timeslot Ts4 and the fifth timeslot Ts5) in the transmission time period as discussed in FIG. 1B.

Time may be represented by the "X" axis of the graphical representation 100F, as shown. Beams allocated to each of the plurality of CPEs 107 may be represented by the "Y" axis of the graphical representation 100F. In accordance with an embodiment, the active repeater device 102 may be configured to transmit the plurality of beams 110 of output RF signals to the plurality of CPEs 107 based on the first set of beam settings during the first timeslot Ts1 (as represented by graph component 118A). The active repeater device 102 may be configured to transmit the plurality of beams 110 of output RF signals to the plurality of CPEs 107 based on the second set of beam settings during the second timeslot Ts2 (as represented by graph component 118B). The active repeater device 102 may be configured to transmit the plurality of beams 110 of output RF signals to the plurality of CPEs 107 based on the third set of beam settings during the third timeslot Ts3 (as represented by graph component 118C). The active repeater device 102 may be configured to transmit the plurality of beams 110 of output RF signals to the plurality of CPEs 107 based on the fourth set of beam settings during the fourth timeslot Ts4 (as represented by graph component 118D). The active repeater device 102 may be configured to transmit the plurality of beams 110 of output RF signals to the plurality of CPEs 107 based on the first set of beam settings during the fifth timeslot Ts5 (as represented by graph component 118E), and thus the cycle may continue until all data is communicated).

Figure 2A:
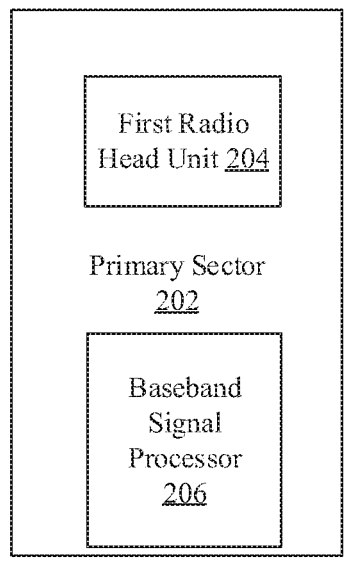
FIG. 2A is a block diagram illustrating an exemplary one-sector active repeater device, in accordance with an exemplary embodiment of the disclosure.

FIG. 2A is a block diagram illustrating an exemplary one-sector active repeater device, in accordance with an exemplary embodiment of the disclosure. FIG. 2A is explained in conjunction with elements from FIG. 1. With reference to FIG. 2A, there is shown a one-sector active repeater device that includes a primary sector 202 of the active repeater device 102. The primary sector 202 of the active repeater device 102 comprises a first radio head (RH) unit 204 and a baseband signal processor 206.

In some embodiments, the first RH unit 204 may be implemented in the active repeater device 102 as a radio head (RH) card. Similarly, the baseband signal processor 206 may be implemented in the active repeater device 102 as a baseband signal processing card or chip. Other examples of implementations of the RH card and the baseband signal processor card may include, but is not limited to an integrated circuit using a single or separate printed circuit boards (PCBs) as substrates, a radio frequency integrated chip (RFIC) and a system on a chip (SoC) device. The first RH unit 204 and the baseband signal processor 206 may be housed within the primary sector 202 of the active repeater device 102. The first RH unit 204 and the baseband signal processor 206 may be communicatively coupled with each other via a wired or wireless communication medium. The first RH unit 204 and the baseband signal processor 206 may communicate control signals and analog baseband signals with each other.

Figure 2B:
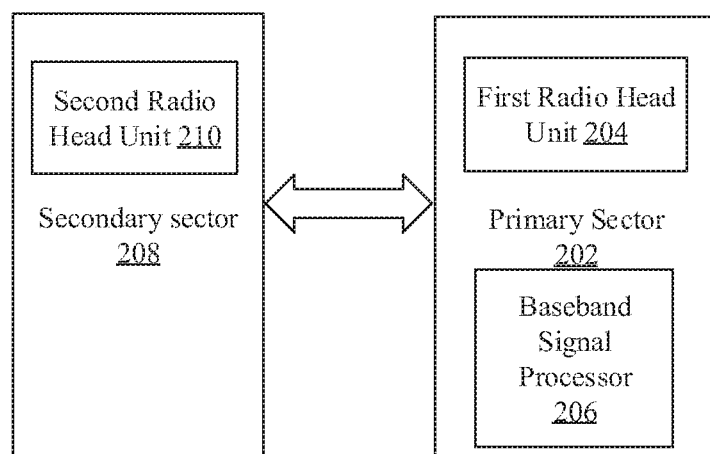
FIG. 2B is a block diagram illustrating an exemplary two-sector active repeater device, in accordance with an exemplary embodiment of the disclosure.

FIG. 2B is a block diagram illustrating an exemplary two-sector active repeater device, in accordance with an exemplary embodiment of the disclosure. FIG. 2B is explained in conjunction with elements from FIGS. 1 and 2A. With reference to FIG. 2B, there is shown a two-sector active repeater device that includes the primary sector 202 of the active repeater device 102 (of FIG. 2A) and a secondary sector 208. The secondary sector 208 may include a second RH unit 210. The second RH unit 210 may be similar to the first RH unit 204. The secondary sector 208 may be communicatively coupled with the primary sector 202 via one or more signal cables (e.g. a control signal cable and two baseband (IQ) signal cables).

Figure 2C:
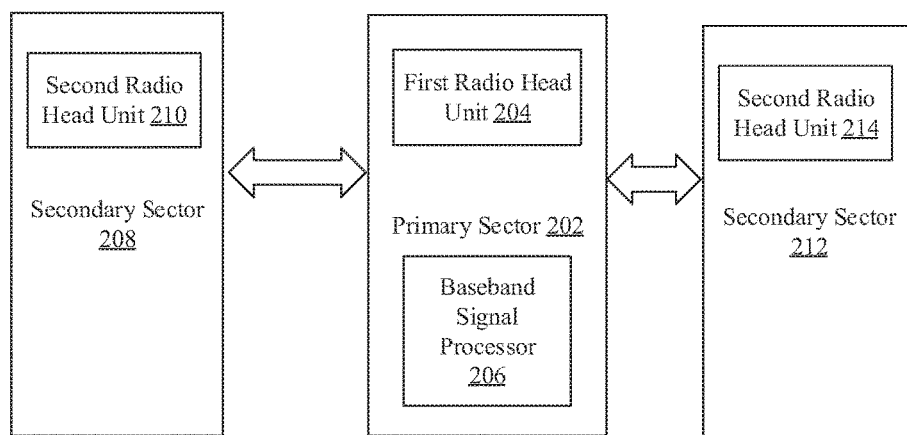
FIG. 2C is a block diagram illustrating an exemplary three-sector active repeater device, in accordance with an exemplary embodiment of the disclosure.

FIG. 2C is a block diagram illustrating an exemplary three-sector active repeater device, in accordance with an exemplary embodiment of the disclosure. FIG. 2C is explained in conjunction with elements from FIGS. 1, 2A, and 2B. With reference to FIG. 2C, there is shown a three-sector active repeater device that includes an additional secondary sector, such as a secondary sector 212, connected to the two-sector active repeater device of FIG. 2B. The secondary sector 212 may include a second RH unit 214 similar to the second RH unit 210. The secondary sector 212 may be communicatively coupled to the primary sector 202 via the one or more signal cables. As a result of this modular architecture, the active repeater device 102 may be upgradable or re-configurable to at least one of a base station (gNB), a small cell access point, or a remote radio head (RRH). The active repeater device 102 may be upgraded by replacing the baseband signal processor 206 with a suitable baseband unit (BBU) known in the art. The baseband signal processor 206 of the primary sector 202 may be configured to support multi-band millimeter wave (mm Wave) spectrum and sub-30 GHz spectrum concomitantly.

The baseband signal processor 206 of the primary sector 202 of the active repeater device 102 does not process (i.e., demodulate) data stream in the received signal intended for end destination (i.e. the plurality of UEs 106A and 106B). The data stream may also be referred to as the data portion of the received first beam of input RF signals. The baseband signal processor 206 may decode only the header potion of the received signal to extract control information without demodulation of data portion of the received signal. Conventional active repeaters are simply digital signal amplifiers, which may decode both the header portion and the data portion for amplification, which adds to latency in communication. Further, a conventional baseband unit (BBU) is voluminous, and is typically placed in an equipment room in mobile telecommunications systems and connected with the remote radio head unit (RRU), via optical fiber. In contrast, the baseband signal processor 206 of the primary sector 202 of the active repeater device 102 may be implemented as the baseband signal processor card or chip, which is smaller in size in comparison to the conventional BBU and consumes less power in comparison to the conventional BBU. Thus, the baseband signal processor 206 may also be referred to as a light baseband unit (LBU) or a simplified baseband unit (BBU) that may be smaller in size as compared to a conventional BBU. The baseband signal processor 206 may thus be housed in the primary sector 202 of the active repeater device 102, as shown.

Figure 3:
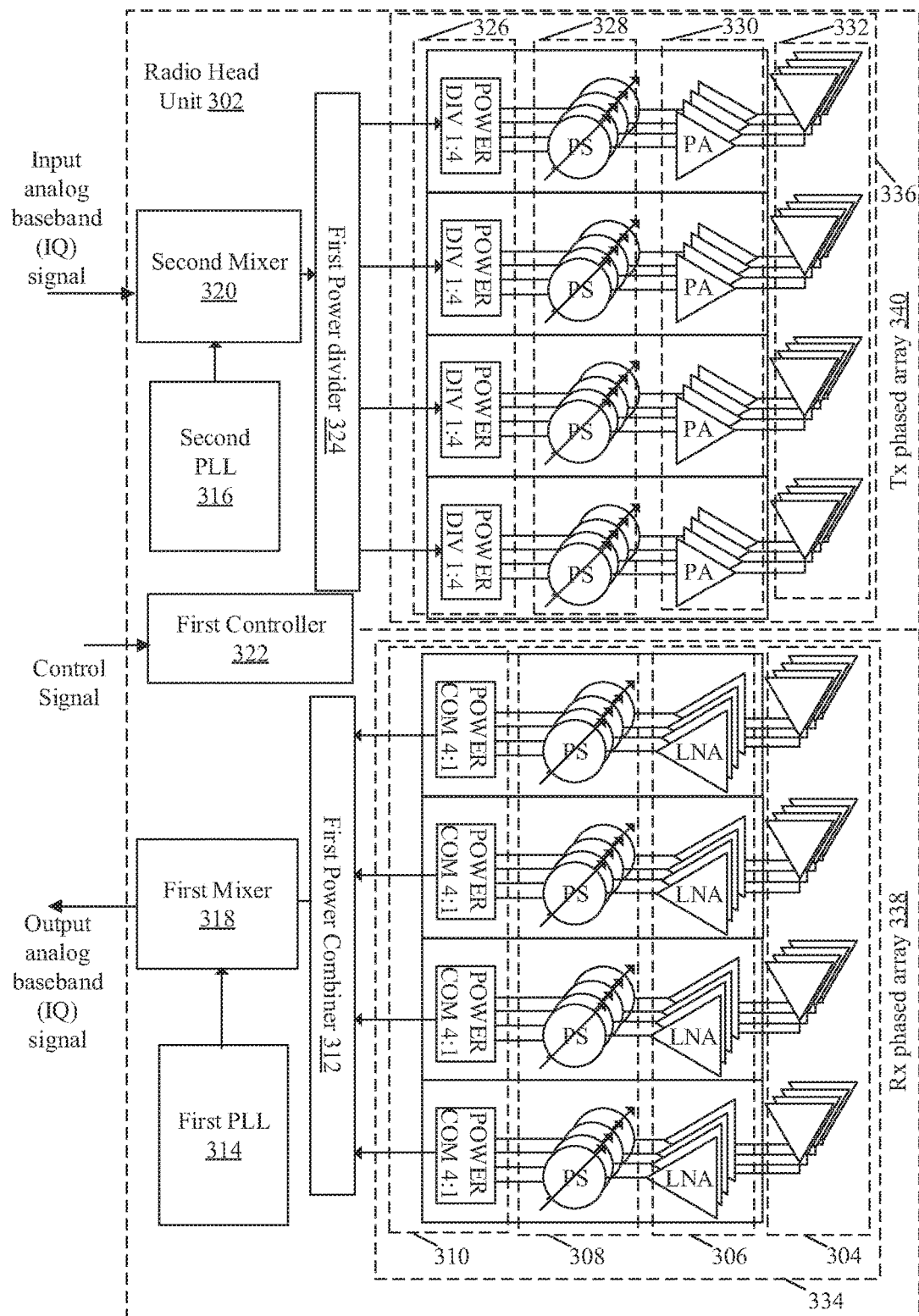
FIG. 3 depicts a circuit diagram illustrating various components of an exemplary radio head unit in an exemplary active repeater device for beam widening to communicate with a plurality of user equipment, in accordance with an exemplary embodiment of the disclosure.

FIG. 3 depict circuit diagrams illustrating various components of an exemplary radio head unit in the active repeater device, in accordance with an exemplary embodiment of the disclosure. FIG. 3 is explained in conjunction with elements from FIGS. 1, 2A, 2B, and 2C. With reference to FIG. 3, there is shown a radio head (RH) unit 302. The RH unit 302 may be one of the first RH unit 204, the second RH unit 210, the second RH unit 214 or any other radio head units in the active repeater device 102. The RH unit 302 comprises a receiver (Rx) phased array 338 and a transmitter (TX) phased array 340. The Rx phased array 338 may include a cascading receiver chain 334 comprising a first antenna array 304, a first set of low noise amplifiers (LNA) 306, a first set of phase shifters 308, and a first set of power combiners 310. The Tx phased array 340 may include a cascading transmitter chain 336 comprising a first set of power dividers 326, a first set of phase shifters 328, a first set of power amplifiers (PA) 330, and a second antenna array 332. There are is also shown a first power combiner 312, a first mixer 318, a second mixer 320, a first phase locked loop (PLL) 314, a second PLL 316, a first controller 322, and a first power divider 324 in the RH unit 302.

In accordance with an embodiment, the first antenna array 304 may be configured to receive the first beam of input RF signals having the first beam pattern from the base station 104. The first antenna array 304 may comprise a first set of antenna elements. The first antenna array 304 may be configured to receive the first beam of input RF signals using the first set of antenna elements. Examples of implementations of the first antenna array 304 may include, but is not limited to a planar phased array antenna, a frequency scanning phased array antenna, or a dynamic phased array antenna. The plurality of antenna elements in the first antenna array 304 may be communicatively coupled to one or more LNAs in the first set of LNAs 306.

The first set of LNAs 306 may be configured to amplify input RF signals received at the first antenna array 304. The first set of LNAs 306 may be configured to amplify input RF signals, which may have low-power, without significantly degrading corresponding signal-to-noise (SNR) ratio. Each of the first set of LNAs 306 may be communicatively coupled to phase shifters in the first set of phase shifters 308. The first set of phase shifters 308 may perform an adjustment in phase values of the input RF signals, till combined signal strength value of the received input RF signals, is maximized. In one example, the first set of phase shifters 308 may perform an adjustment in the phase value till each of the received input RF signals are in-phase with each other. Phase shifters in the first set of phase shifters 308 may be communicatively coupled to power combiners, such as a 4:1 power combiner, in the first set of power combiners 310. Further, each of the first set of power combiners 310 may be coupled to the first power combiner 312.

Each of the first set of power combiners 310 may be configured to combine each of the phase shifted input RF signals into a first set of RF signals. The first set of power combiners 310 may be configured to transmit the first set of RF signals to the first power combiner 312. The first power combiner 312 may be configured to combine the first set of RF signals to a first RF signal. The first power combiner 312 and the first set of power combiners 310 may comprise both active and passive combiners. Examples of implementation of the first power combiner 312 and the first set of power combiners 310 may include, but is not limited to resistive power combiners, and solid-state power combiners. The first power combiner 312 may be further configured to communicate the first RF signal to the first mixer 318.

The first mixer 318 may be configured to down convert the first RF signal to an output analogue baseband (IQ) signal. The first mixer 318 may be configured to down convert the first RF signal with a first frequency to the baseband signal based on mixing of a second frequency generated by a local oscillator with the first RF signal. The first mixer 318 may be communicatively coupled with the first PLL 314. The first PLL 314 in combination with the first mixer 318 may be configured to down convert the first Signal into an analog baseband quadrature (IQ) output signal. The first mixer 318 may be configured to communicate the IQ output signal to the baseband signal processor 206 via a first IQ signal cable.

The second mixer 320 may be configured to receive an analog baseband (IQ) input signal from the baseband signal processor 206 via the second IQ signal cable. Further, the second mixer 320 and the second PLL 316 may be configured to up convert the received IQ input signal to a second RF signal. The second mixer 320 may be configured to up convert the IQ input signal to the second RF signal based on mixing of a third frequency generated by a local oscillator (provided by the second PLL 3160 with the IQ input signal. The second mixer 320 may be communicatively coupled to the first power divider 324. Further, each of the first set of power dividers 326 may be communicatively coupled to the first power divider 324. The combination of the second mixer 320 and the second PLL 316 may be configured to transmit the second RF signal to the first power divider 324.

Figure 4:
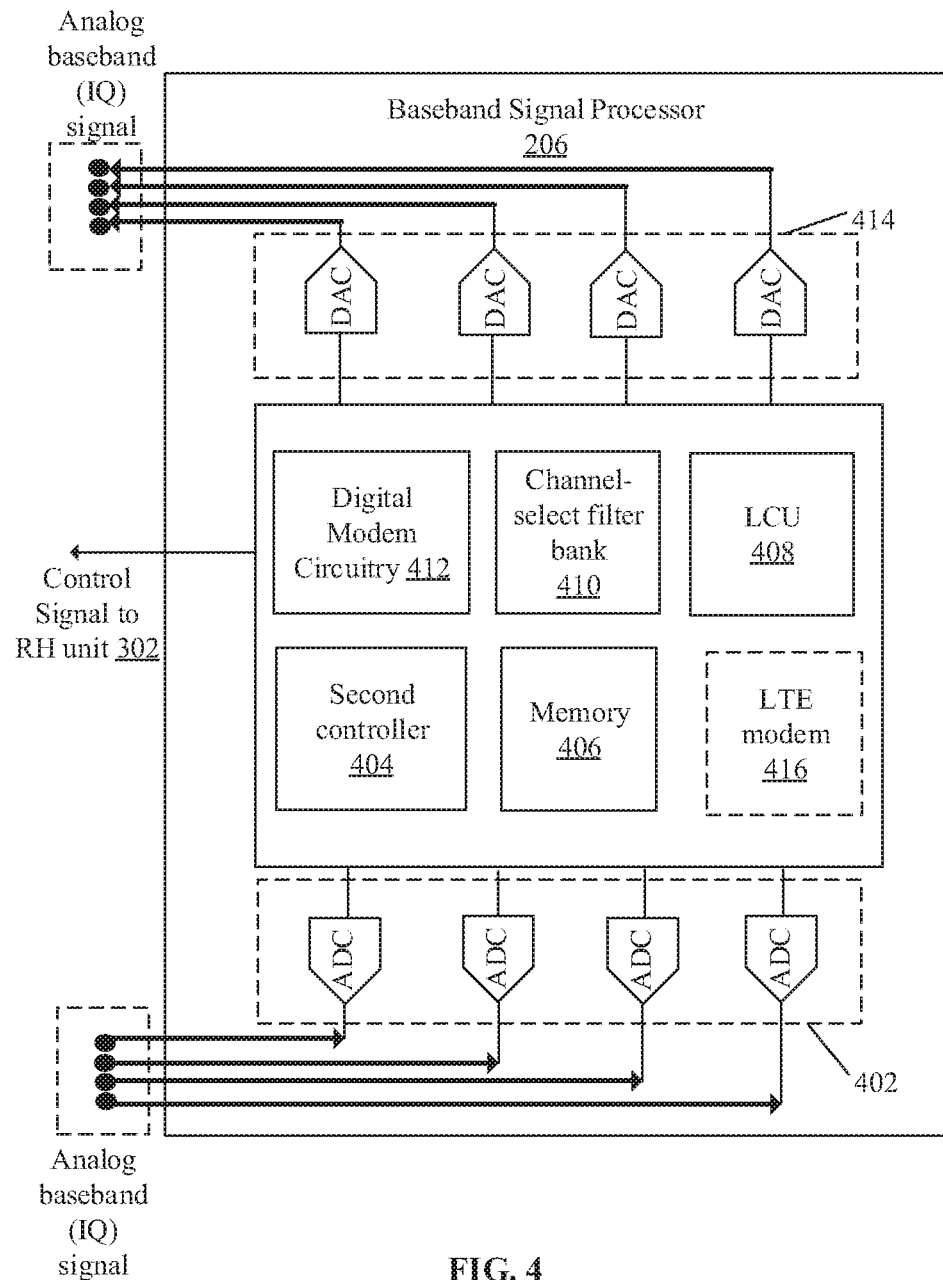
FIG. 4 depicts a block diagram illustrating various components of an exemplary baseband signal processor in an exemplary active repeater device for beam widening to communicate with a plurality of user equipment, in accordance with an exemplary embodiment of the disclosure.

The first controller 322 may be communicatively coupled to the baseband signal processor 206 via a control signal cable. The first controller 322 may be configured to receive one or more control signals from the baseband signal processor 206. The first controller 322 may be configured to adjust one or more parameters (e.g., amplifier gains, and phase responses) associated with the receiver (Rx) phased array 338 and the transmitter (Tx) phased array 340 based on the received one or more control signals. In one example, the first controller 322 may be configured to adjust amplifier gains of each of the first set of LNAs 306 and the first set of PAs 330 in the active repeater device 102. In another example, the first controller 322 may be configured to control each of the first set of phase shifters 308 and the second set of phase shifters 328, based on the received control signal. Further, the first controller 322 may be configured to receive beamforming coefficients from the baseband signal processor 206. The first controller 322, in association with the first set of phase shifters 308 and the first antenna array 304 may be configured to receive the first beam of input RF signals having the first beam pattern. The first controller 322 in association with the second set of phase shifters 328 and the second antenna array 332 may be configured to generate the second beam pattern to be communicated by the second antenna array 332 based on the received beamforming coefficients from the. In accordance with an embodiment, the first controller 322 may be configured to adjust phase shifts of a plurality of output RF signals using the second set of phase shifters 328 to generate a second beam of the plurality of output RF signals, based on the received control signal from the baseband signal processor 206 (FIG. 4).

The first power divider 324 may be configured to split the second RF signal received from the second mixer 320. In one example, the first power divider 324 may comprise one or more input differential pair and two cascode pairs that may split output current into two or more branches. In another example, the first power divider 324 may further compensate for RF signal loss to achieve an efficient RF power transfer. In another example, the first power divider 324 may be configured to split the second RF signal into a second set of RF signals. The first power divider 324 may be configured to communicate the second set of RF signals into the first set of power dividers 326. The first set of power dividers 326 may be configured to further split the second set of RF signals into a plurality of RF signals. The first set of power dividers 326 may be communicatively coupled to the second set of phase shifters 328.

The second set of phase shifters 328 may be configured to receive the plurality of RF signals from the first set of power dividers 326. The second set of phase shifters 328 may be configured to perform a phase shift on each of the plurality of RF signals for beam forming (e.g. synthesis of a wider beam) of the plurality of RF signals based on beamforming coefficients received from the baseband signal processor 206. The control information may be received by the first controller 322 and processed in conjunction with the second set of phase shifters 328. The second set of phase shifters 328 may be configured to transmit the plurality of phase shifted RF signals to the first set of PAs 330. The second set of phase shifters 328 may be configured to transmit the plurality of phase shifted RF signals to the first set of PAs 330.

The first set of PAs 330 may be configured to adjust an amplification gain of each of the plurality of RF signals on which phase shift has been performed by the second set of phase shifters 328. The amplification gain of each of the plurality of RF signals may be adjusted based on the control signal received from the first controller 322. The amplification gain of each of the plurality of RF signals may be adjusted based on the control signal received from the first controller 322. The first set of PAs 330 may be configured to transmit the plurality of RF signals to the second antenna array 332.

In accordance with an embodiment, the second antenna array 332 may be configured to transmit one or more beams having the second beam patterns (i.e. the widened beams) of the plurality of output RF signals to the plurality of UEs 106A, and 106B (downlink communication). In accordance with an embodiment, the second antenna array 332 may be a phased array antenna. The second antenna array 332 may comprise a second set of antenna elements. The second antenna array 332 may be configured to transmit the plurality of output RF signals by use of the second set of antenna elements. In accordance with an embodiment, the second antenna array 332 may be configured to relay the plurality of output RF signals to the base station 104 in a first beam pattern in the uplink communication. Examples of implementations of the first antenna array 304 may include, but is not limited to a linear phased array antenna, a planar phased array antenna, a frequency scanning phased array antenna, a dynamic phased array antenna, and a passive phased array antenna.

In operation, the first antenna array 304 may be configured to receive a first beam of input RF signals. In one example, the first antenna array 304 may be configured to receive the first beam of input RF signals from the base station 104. In one example, the active repeater device 102 may be configured to be activated when the first antenna array 304 receives the first beam of input RF signals from the base station 104 (or another active repeater device 102).

In a case where only the beam widening mode is set in the active repeater device 102, the active repeater device 102 may transmit a second beam of one or more output RF signals based on the received input RF signals, to the plurality of UEs 106A and 106B by the second antenna array 332 of the TX phased array 340. The first beam may have a first beam pattern and the second beam may have a second beam pattern. The first beam may be a narrow beam or a pencil beam, which may cover a first geographical area. The second beam having the second beam pattern may cover a second geographical area. The second beam pattern may be wider than the first beam pattern. Further, the second geographical area may be larger than the first geographical area covered by the first beam. The second geographical area may cover locations of the plurality of UEs 106A and 106B. A narrow beam (such as the first beam) may have higher transmission range but provides less coverage as compared to a widened beam (such as the second beam) that have comparatively lesser transmission range but provide greater coverage. In a case where the switching multi-beam mode is set, the second antenna array 332 of the TX phased array 340 may transmit the plurality of beams 110 of one or more output RF signals to the plurality of CPEs 107 by switching the plurality of beams 110 of output RF signals based on the assigned different timeslot and the assigned different beam setting to each of the plurality of CPEs 107, and the received first beam of input RF signals from the base station 104. In a case where the concurrent multi-beam mode is set, the second antenna array 332 of the TX phased array 340 (or one or more second antenna arrays) may be configured to concurrently transmit the plurality of beams 110 of output RF signals to the plurality of CPEs 107 based on the assigned different beam setting to each of the plurality of CPEs 107. A full-bandwidth signal received from the base station 104 is re-transmitted concurrently to the plurality of CPEs 107 over the plurality of beams 110 of output RF signals. In a case where the static beam mode is set, the second antenna array 332 of the TX phased array 340, under the control of a controller (such as the second controller 404 of FIG. 4), is further configured to re-transmit the first beam of input RF signals that received as a single narrow stream that covers a full frequency channel, over a single narrow beam of output RF signals in the first beam pattern (a narrow beam same as the received narrow beam from base station 104). This may be done when the single beam of output RF signals is expected or known to cover all the plurality of CPEs 107 (or UEs).

The first set of LNAs 306 in the RH unit 302 may be configured to adjust a first amplification gain of each of the received input RF signals. In accordance with an embodiment, the first set of phase shifters 308 may be configured to perform a first phase shift on each of the input RF signals with the adjusted first amplification gain. It may be noted that the first amplification gain of the first set of LNAs 306 may be adjusted by the first controller 322 based on the received control signal from the baseband signal processor 206. Similarly, the first phase shifts of input RF signals may be adjusted by the first controller 322 using the first set of phase shifters 308 based on the received control signal from the baseband signal processor 206. In accordance with an embodiment, the first set of power combiners 310, and the first power combiner 312 in combination, may be configured to combine the input RF signals to generate the first RF signal. The first RF signal may be down converted by the combination of the first mixer 318 and the first PLL 314 to an IQ output signal. The IQ output signal may be communicated by the combination of the first mixer 318 and the first PLL 314 to the baseband signal processor 206 via an IQ signal cable.

Further, the second mixer 320 may be configured to receive the IQ input signal from the baseband signal processor 206 via a second IQ signal cable. In accordance with an embodiment, the IQ input signal may be up converted by the combination of the second mixer 320 and the second PLL 316 to a second RF signal. The first power divider 324 may be configured to split the second RF signal into a second set of RF signals. The first set of power dividers 326 may be configured to further split the second set of RF signals into one or more output RF signals. In accordance with an embodiment, the second set of phase shifters 328 may be configured to adjust phase values of each of the output RF signals. Furthermore, the first set of PAs 330 may be configured to adjust an amplification gain of each of the output RF signals on which phase shift has been performed by the second set of phase shifters 328. The second antenna array 332 may be configured to generate the second beam having the second beam pattern, based on the adjusted phase shifts and the adjusted amplification gains of each of the output RF signals. In accordance with an embodiment, the second antenna array 332 may be configured to transmit the second beam of the output RF signals having the second beam pattern to the plurality of UEs 106A and 106B. The second beam of the output RF signals having the second beam pattern corresponds to a wider beam as compared to the narrow beam (such as the first beam) received from the base station 104.

In accordance with an embodiment, the active repeater device 102 may function in a phase-only excitation beamforming mode. In the phase-only excitation beamforming mode, the generation of the second beam pattern by the second antenna array 332 may be based on the adjustment of the phase shifts of the output RF signals using the second set of phase shifters 328 by the first controller 322. The first controller 322 may be configured to generate the second beam pattern independent of amplitude tapering of the second antenna array 332. The active repeater device 102 may be configured to generate the second beam pattern exclusively based on adjusting phase shifts of output RF signals using the second set of phase shifters 328 and independent of changes in amplitude of the RF output signals. The first controller 322 may be configured to adjust the phase shifts based on a quadratic phase distribution scheme.

In accordance with an embodiment, the active repeater device 102 may function in an antenna sub-array superposition mode. In the sub-array antenna superposition mode, the first controller 322 may be configured to partition the second set of antenna elements of the second antenna array 332 into a plurality of spatially separated antenna sub-arrays. The second antenna array 332 may be configured to generate a first set of beams of output RF signals based on the partition. Each of the plurality of spatially separated antenna sub-arrays may generate one or more of the first set of beams. Further the second beam pattern may be generated by super-position of the first set of beams of output RF signals with each other. The second beam having the second beam pattern may be wider than the first beam having the first beam pattern. The second beam having the second beam pattern may cover a second geographical area. The second geographical area may be larger than the first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B to save communication bandwidth. Therefore, the active repeater device 102 may be configured to convert a narrow beam or a pencil-beam (such as the first beam having the first beam pattern) into a widened beam (such as the second beam having the second beam pattern).

FIG. 4 depicts a block diagram illustrating various components of an exemplary baseband signal processor in the active repeater device, in accordance with an exemplary embodiment of the disclosure. FIG. 4 is explained in conjunction with elements from FIGS. 1, 2A, 2B, 2C, and 3. With reference to FIG. 4, there is shown the baseband signal processor 206. The baseband signal processor 206 comprises a first set of analogs to digital converters (ADC) 402, a second controller 404, a memory 406, a transmitter receiver control sector-sector routing multiplexer logic control unit (hereafter referred to as Logical control unit 408 (LCU)), a channel-select filter bank 410, a digital modem circuitry 412, and a first set of digital to analog circuitry (DAC) 414. In some embodiments, the baseband signal processor 206 may also include a Long Term Evolution (LTE) modem 416. In some embodiments, the baseband signal processor 206 may not include the LTE modem 416. In accordance with an embodiment, the second controller 404 may be a digital signal processor. In accordance with an embodiment, the memory 406 may store code and logic which may correspond to a plurality of digital filters, a plurality of signal processing algorithms, a plurality of signal encoding algorithms, and a plurality of signal decoding algorithms. Further, the channel select filter bank 410 may comprise a plurality of channel select filters.

The baseband signal processor 206 may be communicatively coupled with one or more RH units (referred to as a first set of RH units) based on the implementation of the active repeater device 102 as the one-, two-, or three-sectored active repeater device as discussed in FIGS. 2A, 2B, and 2C. An example of RH units in the first set of RH units may include, but is not limited to the first RH unit 204, the second RH unit 210, and the second RH unit 214. The baseband signal processor 206 may be communicatively coupled to RH units in the first set of RH units via one or more IQ signal cables and control signal cables.

In operation, the baseband signal processor 206 may be configured to receive a first set of IQ analog signals from the first set of RH units. Each IQ signal of the first set of IQ signals may be received by the baseband signal processor 206, from a corresponding RH unit in the first set of RH units. Thereafter, the first set of ADCs 402 may be configured to convert the first set of analog IQ signals to the first set of coded data signals. Thus, in other words, the first set of coded data signals may correspond to input RF signals received from the base station 104 and the plurality of UEs 106A and 106B. The digital modem circuitry 412 may be configured to extract control information from the first set of coded data signals. It has been mentioned that the first set of coded data signal comprises a sequence of frames. The sequence of frames may comprise data frames and control frames. The digital modem circuitry 412 may be configured to demodulate only the header portions of frames in the first set of coded data signals to extract the control information, as discussed in FIG. 1.

In accordance with an embodiment, the second controller 404 may be configured to analyze the extracted control information to determine destination receivers for each of the first set of coded data signals. The destination receivers may be receivers of RF devices, to which the input RF signals associated with the first set of coded data signals are intended to be transmitted from a source transmitter. Examples of such RF devices may include, but is not limited to the plurality of UEs 106A and 106B, the base station 104, and/or any other active repeater devices. Further, the LCU 408 may be configured to assign each of the first set of coded data signals to one or more of the first set of RH units (the first RH unit 204, the second RH unit 210, and the second RH unit 214) based on the determined destination receivers. In accordance with an embodiment, the first set of DACs 414 may be configured to convert the first set of coded data signals to a second set of IQ analog signals. Each of the second set of IQ analog signals may correspond to a coded data signal in the first set of coded data signals. The baseband signal processor 206 may be configured to transmit each of the second set of IQ analog signals to one or more of the first set of RH units based on assignment of the first set of coded data signals by the LCU 408.

In certain scenarios where the input RF signals are received from the plurality of UEs 106A and 106B, a first set of coded data signals may be generated similar to input RF signals received from the base station 104, as discussed. In such cases, the second controller 404 in the baseband signal processor 206 may be configured to measure a received signal strength indicator (RSSI) of each of the first set of coded digital signals in digital domain. The second controller 404 may be further configured to filter the first set of coded data signals based on one or more channel select filters in the channel-select filter bank 410. The second controller 404 may be configured to suppress adjacent channel signals in the first set of coded data signals by applying the channel select filters on the first set of coded data signals. By suppression of the adjacent channel signals in the first set of coded data signals, the second controller 404 may be configured to increase accuracy of the RSSI measurement in digital domain.

In accordance with an embodiment, the second controller 404 may generate one or more control signals based on the extracted control information and the measured RSSI. The second controller 404 may transmit the generated control signals to one or more of the first set of RH units (the first RH unit 204, the second RH unit 210, and the second RH unit 214). The one or more control signals may be received by the first controller 322 in an RH unit (such as the RH unit 302) in the first set of RH units (the first RH unit 204, the second RH unit 210, and the second RH unit 214). The first controller 322 may be configured to adjust amplification gains of the first set of LNAs 306 of the Rx phased array 338 based on the received one or more control signals from the second controller 404. The second controller 404 may thereby, adjust gain distribution within the Rx phased array 338 based on the measured RSSI. Further, the first controller 322 may be configured to adjust amplitude gains of the first set of PAs 330 in the cascading transmitter chain 336, based on the received one or more control signals from the second controller 404. Alternatively stated, the second controller 404 in association with the first controller 322 may adjust gain distribution within the cascading receiver chain 334 based on the measured RSSI.

In accordance with an embodiment, the second controller 404 may generate one or more beamforming coefficients based on the extracted control information and the measured RSSI. The second controller 404 may transmit the generated beamforming coefficients to one or more of the first set of RH units (the first RH unit 204, the second RH unit 210, and the second RH unit 214). The generated beamforming coefficients may be received by the first controller 322 in an RH unit (such as the RH unit 302) in the first set of RH units (the first RH unit 204, the second RH unit 210, and the second RH unit 214). The first controller 322 in association with the first set of phase shifters 308 and the first antenna array 304 may be configured to generate a first beam pattern in the first antenna array 304 based on the generated beamforming coefficients. The first controller 322 in association with the second set of phase shifters 328 and the second antenna array 332 may be configured to generate the second beam pattern in the second antenna array 332 based on the generated beamforming coefficients.

The second beam generated at the second antenna array 332 based on the generated beamforming coefficients may be wider than the first beam generated at the first antenna array 304. A first geographical area covered by the first beam may be smaller than a second geographical area covered by the second beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. Therefore, the active repeater device 102 may be configured to convert a narrow beam or a pencil-beam (such as the first beam having the first beam pattern) into a widened beam (such as the second beam having the second beam pattern). In accordance with an embodiment, the first controller 322 may be configured to adjust phase shifts of a plurality of output RF signals using the second set of phase shifters 328 to generate a second beam of the plurality of output RF signals, based on the received beamforming coefficients.

In accordance with an embodiment, the first controller 322 may be configured to partition a second set of antenna elements of the second antenna array 332 into a plurality of spatially separated antenna sub-arrays, based on the received one or more control signals. Alternatively stated, the second controller 404, in association with the first controller 322, may be configured to partition the second set of antenna elements of the second antenna array 332 into the plurality of spatially separated antenna sub-arrays. The second antenna array 332 may be configured to generate a first set of beams of output RF signals based on the partition. The second beam pattern may be generated by super-position of the first set of beams of output RF signals with each other. In some embodiments, the second controller 404 and the first controller 322 may be implemented as a single controller. In accordance with an embodiment, the LTE modem 416 may be configured to perform one or more tasks such as configuring and monitoring beamforming functions of the active repeater device 102. The LTE modem 416 may be further configured to perform timing synchronization and frequency synchronization with the base station 104 and the plurality of UEs 106A and 106B.

Figure 5A:
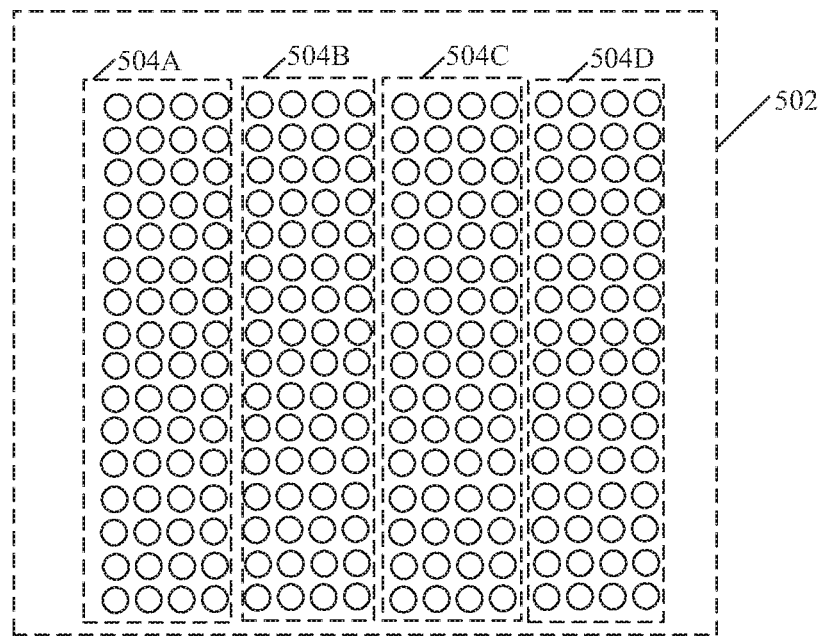
FIG. 5A depicts a block diagram illustrating a second antenna array in a secondary sector of an exemplary active repeater device, configured to generate a second beam based on superposition of antenna sub-arrays, in accordance with an exemplary embodiment of the disclosure.

FIG. 5A illustrates an exemplary antenna array in an exemplary active repeater device, in accordance with an exemplary embodiment of the disclosure. FIG. 5A is explained in conjunction with elements from FIGS. 1, 2A, 2B, 2C, 3, and 4. With reference to FIG. 5A, there is shown an antenna array 502 of the active repeater device 102. In one example, the antenna array 502 may correspond to the second antenna array 332 (FIG. 3). The antenna array 502 may comprise a set of antenna elements. The first controller 322 may be configured to partition the set of antenna elements of the antenna array 502 into a plurality of spatially separated antenna sub-arrays 504A, 504B, 504C, 504D. The plurality of spatially separated antenna sub-arrays 504A, 504B, 504C, 504D may comprise a first antenna sub-array 504A, a second antenna sub-array 504B, a third antenna sub-array 504C, and a fourth antenna sub-array 504D. The partition may be done dynamically and may be a logical partition.

In one example, the antenna array 502 may comprise 256 antenna elements and has 16 rows and 16 columns. Thus, each of the plurality of spatially separated antenna sub-arrays 504A, 504B, 504C, 504D may comprise 64 elements each. The antenna array 502 may be configured to generate a first set of beams of output RF signals based on the partition. Each of the first set of beams may be generated by a corresponding antenna sub array (i.e. the first antenna sub-array 504A, the second antenna sub-array 504B, the third antenna sub-array 504C, and the fourth antenna sub-array 504D) of the plurality of spatially separated antenna sub-arrays 504. Further, the second beam pattern is generated by super-position of the first set of beams of output RF signals with each other. Generation of the second beam pattern has been explained in detail, for example, in FIG. 5B and FIG. 5C.

Figure 5B:
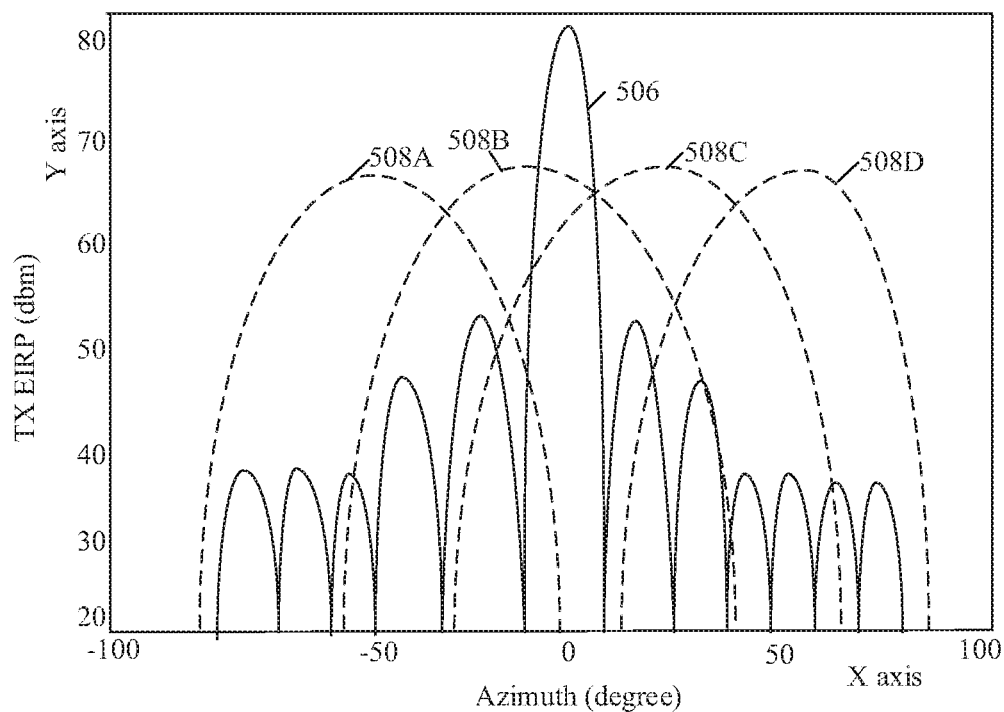
FIG. 5B depicts a first graph illustrating variation of effective isotropic radiated power (EIRP) with respect to azimuth angle of a second antenna array in an exemplary active repeater device for beam widening to communicate with a plurality of user equipment, in accordance with an exemplary embodiment of the disclosure.

FIG. 5B is a first graph illustrating effective isotropic radiated power (EIRP) of an exemplary antenna array in an exemplary active repeater device, in accordance with an exemplary embodiment of the disclosure. With reference to FIG. 5B, there is shown a first graph 500B which depicts EIRP of the antenna array 502 with respect to azimuth angle of the antenna array 502 of FIG. 5A. The azimuth angle with respect to a horizontal plane of the antenna array 502 may be represented by the "X" axis of the first graph 500B, as shown. The EIRP may be represented by the "Y" axis of the first graph 500B.

In certain scenarios, the antenna array 502 may be configured to generate a narrow beam (as represented by graph component 506). In other scenarios, the first controller 322 may be configured to partition the antenna array 502 into the plurality of spatially separated antenna sub-arrays 504. The antenna array 502 may be configured to generate the first set of beams 508A, 508B, 508C, and 508D based on the partition. The first antenna sub-array 504A (FIG. 5A) may be configured to generate a beam (EIRP of the generated beam is represented by graph component 508A) of the first set of beams. Similarly, the second antenna sub-array 504B, the third antenna sub-array 504C, and the fourth antenna sub-array 504D may be configured to generate respective beams (EIRP of the respective beams are represented by graph components 508B, 508C, and 508D respectively) of the first set of beams. In the concurrent multi-beam mode, each of the plurality of beams 110 of output RF signals may be generated by super-position of one or more of the first set of beams. The antenna array 502 may be configured to concurrently transmit the plurality of beams 110 of output RF signals to the plurality of CPEs 107 based on an assigned different beam setting to each of the plurality of CPEs 107.

Figure 5C:
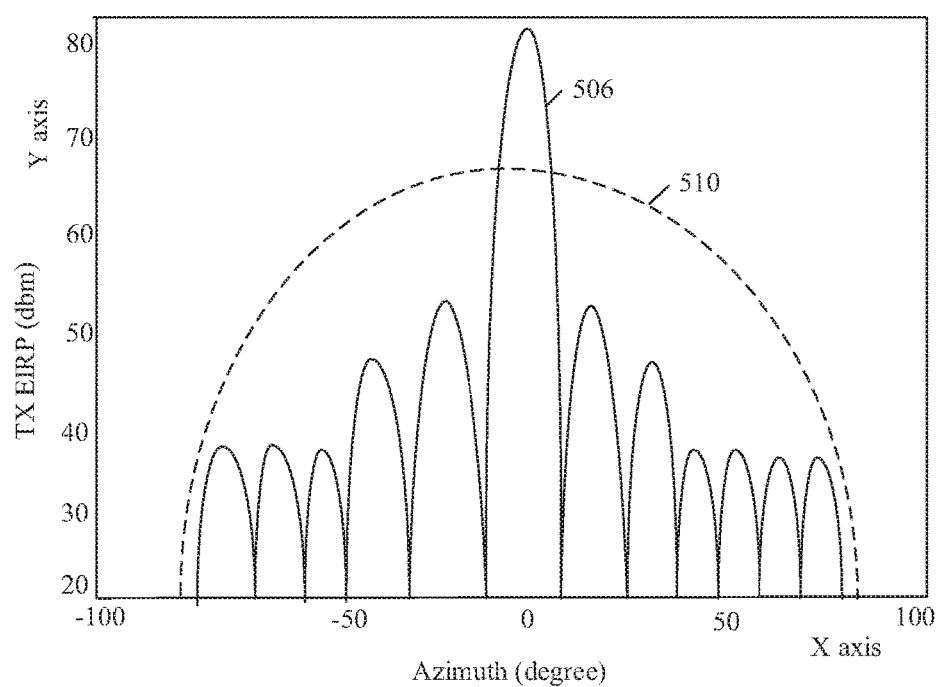
FIG. 5C depicts a second graph illustrating variation of effective isotropic radiated power (EIRP) with respect to azimuth angle of a second antenna array in an exemplary active repeater device for beam widening to communicate with a plurality of user equipment, in accordance with an exemplary embodiment of the disclosure.

FIG. 5C is a second graph illustrating effective isotropic radiated power (EIRP) of an exemplary antenna array in an exemplary active repeater device, in accordance with an exemplary embodiment of the disclosure. The first set of beams (represented by graph components 508A, 508B, 508C, and 508D (FIG. 5B) may superpose with each other to generate the second beam having the second beam pattern (a widened beam as represented by graph component 510). Further, in the concurrent multi-beam mode, the antenna array 502 may be configured to concurrently transmit the plurality of beams 110 of output RF signals to the plurality of CPEs 106 based on an assigned different beam setting to each of the plurality of CPEs 107.

Figure 5D:
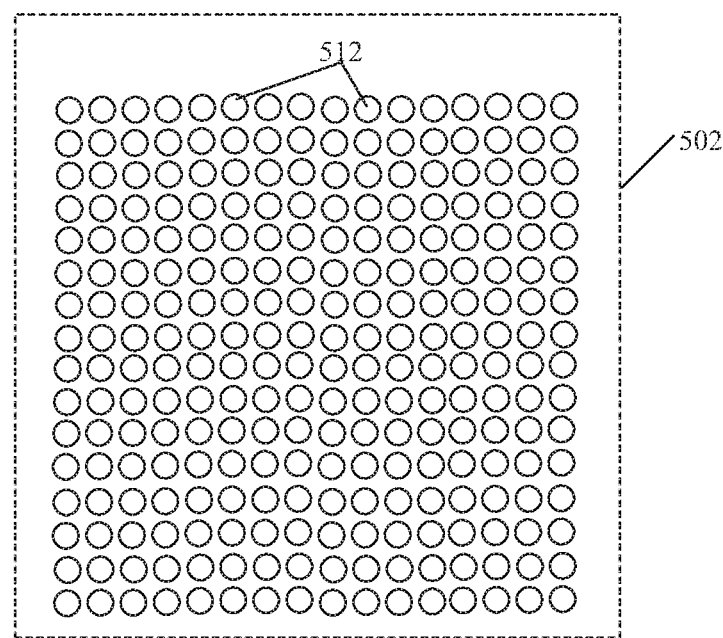
FIG. 5D depicts a block diagram illustrating a second antenna array of an exemplary active repeater device configured to generate a second beam based on phase-only excitation of antenna elements, in accordance with an exemplary embodiment of the disclosure.

FIG. 5D illustrates an exemplary antenna array in an exemplary active repeater device, in accordance with an exemplary embodiment of the disclosure. FIG. 5D is explained in conjunction with elements from FIGS. 1, 2A, 2B, 2C, 3, and 4. With reference to FIG. 5D, there is shown the antenna array 502 of the active repeater device 102. The antenna array 502 may comprise a plurality of antenna elements 512. Each of the plurality of antenna elements 512 may be coupled with the second set of phase shifters 328. The first controller 322 may be configured to adjust phase shifts of output RF signals using the second set of phase shifters 328 to generate the second beam of output RF signals, based on a predefined criterion. The generation of the second beam pattern by the second antenna array 332 is based on the adjustment of the phase shifts of the output RF signals using the second set of phase shifters 328 independent of changes in amplitude of the output RF signals. In case the concurrent multi-beam mode is set, the antenna array 502 may be configured to concurrently transmit the plurality of beams 110 of output RF signals to the plurality of CPEs 106 based on an assigned different beam setting to each of the plurality of CPEs 106.

Figure 6A:
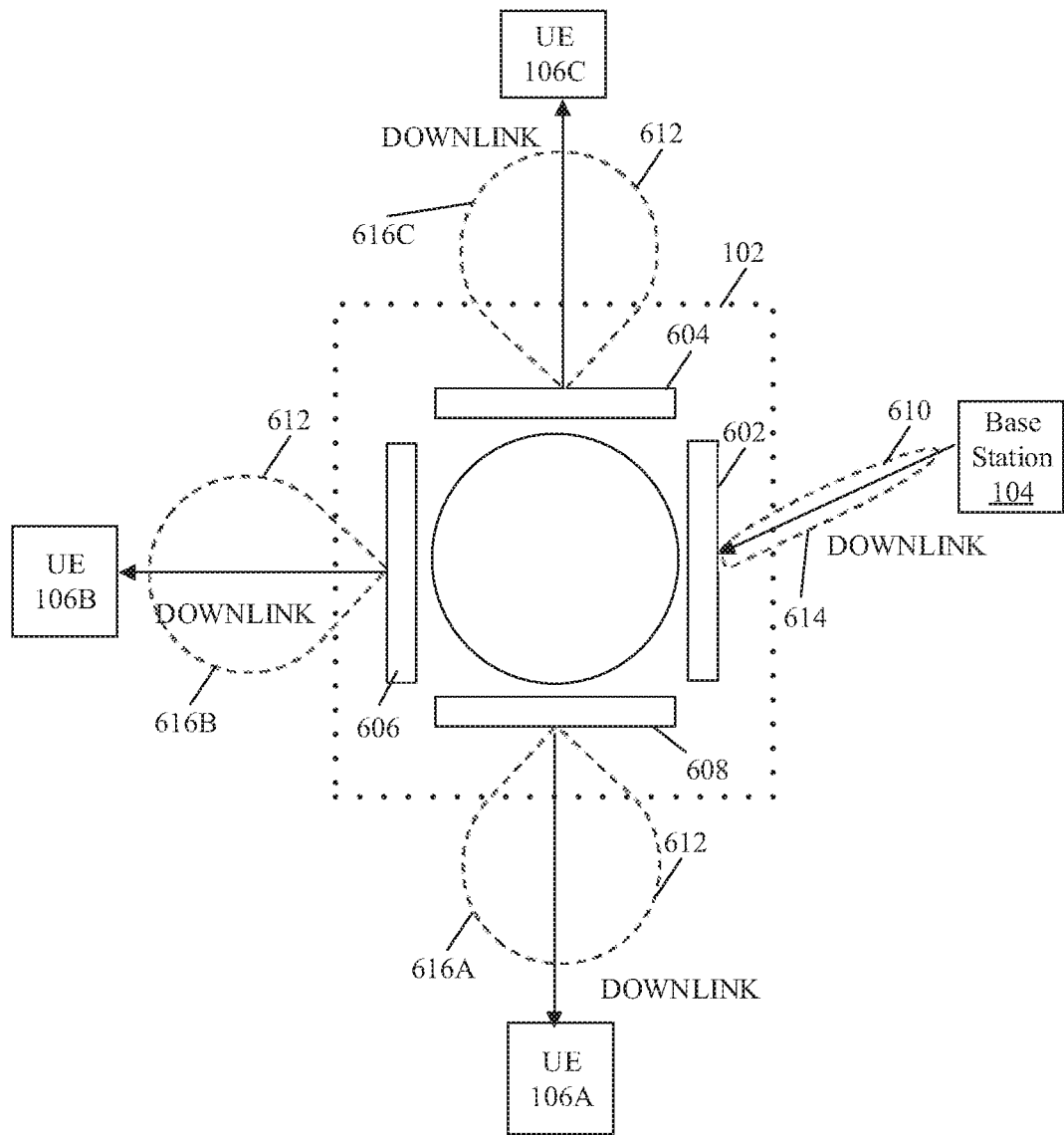
FIG. 6A illustrates a first exemplary scenario for implementation of the active repeater device, in accordance with an embodiment of the disclosure.

FIG. 6A illustrates a first exemplary scenario for implementation of the active repeater device, in accordance with an embodiment of the disclosure. FIG. 6A is explained in conjunction with elements from FIGS. 1, 2A, 2B, 2C, 3, 4, 5A, 5B, 5C, and 5D. The active repeater device 102 may comprise one or more sectors, such as, a primary sector 602, and one or more secondary sectors 604, 606, and 608. The primary sector 602 may correspond to the primary sector 202. The one or more secondary sectors 604, 606, and 608 may correspond to the secondary sectors 208 and 212. (FIGS. 2B and 2C).

The primary sector 602 and each of the one or more secondary sectors 604, 606, and 608, after installation at a defined location (e.g. around a post or pillar), may be configured to cover a portion of a 360-degree scan range for communication among the base station 104, the plurality of UEs 106A, 106B, and 106C, or another repeater device, as shown. The active repeater device 102 may receive a first beam of input RF signals having a first beam pattern 610 from the base station 104. The first beam of input RF signals may be a narrow beam or a pencil-beam.

In accordance with an embodiment, the second controller 404 of the baseband signal processor 206 may be configured to select at least one of the static beam mode, the beam widening mode, the switching multi-beam mode, the concurrent multi-beam mode, or one or more specified combination of the static beam mode, the beam widening mode, the switching multi-beam mode, and the concurrent multi-beam mode based on a change in the configuration setting in the memory 406. The selection may be based on a user-input to change the configuration setting at the active repeater device 102, or an automatic estimation of a number, distances, and a spatial distribution of the plurality of UEs or CPEs to be serviced, or a control command received from a control server (not shown or a base station 104) from a remote location that is different than an installation location of the active repeater device 102. Further, in some embodiments, the second controller 404 of the baseband signal processor 206 may be configured to reconfigure a beam-forming function of the active repeater device 102 to switch between a first operating mode (e.g., a switching multi-beam mode) to a second operating mode (e.g., a concurrent multi-beam mode or other operating modes) of the plurality of operating modes based on the control command received from the control server or base station 104 from a remote location that is different than an installation location of the active repeater device 102.

In case where the beam widening mode is set (or selected), the second controller 404 of the baseband signal processor 206 may be configured to generate beamforming coefficients to convert the first beam pattern of the first beam of input RF signals to the second beam pattern for downlink communication. Each of the one or more secondary sectors 604, 606, and 608 may be configured to transmit a second beam of output RF signals in the second beam pattern 612 to a plurality of UEs based on the generated beamforming coefficients. The second beam pattern 612 may be wider than the first beam pattern 610. The second beam pattern 612 provides wider coverage than the first beam pattern 610.

In case where the switching multi-beam mode is set (or selected), the second controller 404 of the baseband signal processor 206 may be configured to assign a different timeslot from a plurality of available timeslots to each of the plurality of UEs 106A, 106B, and 106C (or plurality of CPEs 107 FIG. 1B), based on scheduling information in the received first beam of input RF signals. The second controller 404 of the baseband signal processor 206 may be configured to assign a different beam setting from the plurality of beam settings to each of the plurality of UEs 106A, 106B, and 106C (or plurality of CPEs 107 FIG. 1B), based on one or more signal parameters associated with the plurality of UEs 106A, 106B, and 106C (or plurality of CPEs 107 FIG. 1B). Each of the one or more secondary sectors 604, 606, and 608 may be communicatively coupled to the primary sector 602. The different beam setting may cause or lead to different beam shapes of a plurality of beams 616A, 616B, 616C of output RF signals (which corresponds to the plurality of beams 110 of output RF signals (FIG. 1B)) which may be generated by the one or more secondary sectors 604, 606, and 608. The plurality of beams 616A, 616B, 616C of output RF signals may comprise a first beam 616A, a second beam 616B, and a third beam 616C.

The second controller 404 may be configured to assign the different beam setting to each of the plurality of UEs 106A, 106B, and 106C (or plurality of CPEs 107 FIG. 1B) based on one or more parameters, such as location or RSSI, associated with each CPE of the plurality of CPEs 106. For example, the second controller 404 may assign beam settings to each UE (or CPE) of thee plurality of UEs 106A, 106B, and 106C (or plurality of CPEs 107 FIG. 1B) based on a particular distance of the respective UE (or CPE) from the active repeater device 102. In such cases, a beam of output RF signals which may be generated based on the assigned beam setting may have a coverage area comprising a location of the respective UE (or CPE). Therefore, it is advantageous that the active repeater device 102 may be configured to optimally transmit the output RF signals to the different UEs (or CPEs) in different beam shapes or beam patterns based on the assigned beam setting to each of the plurality of UEs 106A, 106B, and 106C (or plurality of CPEs 107 FIG. 1B). In accordance with an embodiment, the second controller 404 may assign the beam settings to each CPE of the plurality of UEs 106A, 106B, and 106C (or plurality of CPEs 107 FIG. 1B) based on a set of resource blocks associated with the respective UE (or CPE). The beam of output RF signals to the respective UE (or CPE) may be optimized by the active repeater device 102 based on the assigned beam settings, to improve an overall spectral efficiency of transmission of the output RF signals to the respective UE (or CPE).

The one or more secondary sectors 604, 606, and 608 may be configured to generate the plurality of beams 616A, 616B, 616C of output RF signals based on the received input RF signals. The one or more secondary sectors 604, 606, and 608 may configured to transmit the plurality of beams 616A, 616B, 616C of output RF signals to the plurality of UEs 106A, 106B, and 106C (or plurality of CPEs 107 FIG. 1B) by switching the plurality of beams 616A, 616B, 616C of output RF signals based on the assigned different timeslot and the assigned different beam setting to each of the plurality of UEs 106A, 106B, and 106C (or plurality of CPEs 107 FIG. 1B), and the received first beam of input RF signals from the base station 104. Each of the plurality of beams 616A, 616B, 616C may have a second beam pattern 612. In some embodiments, the second beam pattern 612 may be of same beam shape. In some embodiments, each beam pattern resulting from a different beam setting may have different beam shapes (shown in FIG. 6B).

The one or more secondary sectors 604, 606, and 608 may be configured to switch the plurality of beams 616A, 616B, 616C of output RF signals based on the assigned different timeslot and the assigned different beam setting to each of the plurality of UEs 106A, 106B, and 106C (or plurality of CPEs 107 FIG. 1B). In accordance with an embodiment, the one or more secondary sectors 604, 606, and 608 may be configured to transmit the first beam 616A of output RF signals to the UE 106A of the plurality of UEs 106A, 106B, and 106C (or plurality of CPEs 107 FIG. 1B), exclusively during the first timeslot "Ts1" assigned to the UE 106A. The first beam 616A of output RF signals may be transmitted based the first beam setting assigned to the UE 106A, and based on the received first beam of input RF signals.

Similarly, the second beam 616B, and the third beam 616C of output RF signals may be transmitted exclusively to the UE 106B and the UE 106C, respectively at the second timeslot "Ts2" and the third timeslot "Ts3" respectively. Therefore, the active repeater device 102 may be configured to transmit a beam of output RF signals to a UE (or CPE) of the plurality of UEs 106A, 106B, and 106C (or plurality of CPEs 107 FIG. 1B) exclusively at a timeslot allotted to the respective UE (or CPE).

The active repeater device 102 may not transmit beams of output RF signals to UEs (or CPEs) of the plurality of UEs 106A, 106B, and 106C (or plurality of CPEs 107 FIG. 1B), at timeslots which may not be assigned to the respective UE (or CPE). Thus, the active repeater device 102 may reduce power wastage. Further, the second beam pattern of each of the plurality of beams 616A, 616B, 616C may be narrow beam in comparison with wide beams used in conventional systems. Narrow beams may have larger transmission range in comparison to wide beams. Each beam of the plurality of beams 616A, 616B, 616C may be transmitted exclusively to a corresponding UE (or CPE) of the plurality of UEs 106A, 106B, and 106C (or plurality of CPEs 107 FIG. 1B). The active repeater device 102 may have larger transmission range in comparison to a conventional system (for example, a conventional base station), which may transmit a single wide beam of output RF signals to the plurality of UEs 106A, 106B, and 106C (or plurality of CPEs 107 FIG. 1B).

In case the concurrent multi-beam mode is set (or selected), the plurality of beams 616A, 616B, 616C of the output RF signals may be concurrently transmitted to the plurality of UEs 106A, 106B, and 106C (or plurality of CPEs 107 FIG. 1B) based on the assigned different beam setting to each of the plurality of UEs 106A, 106B, and 106C (or plurality of CPEs 107 FIG. 1B). The second antenna array (e.g. the second antenna array 332) in the one or more secondary sectors (such as the one or more secondary sectors 604, 606, and 608) may be configured to generate each beam of the plurality of beams 616A, 616B, 616C in the second beam pattern based on the generated beamforming coefficients and the received first beam of input RF signals. The full-bandwidth signal received from the base station 104 may be re-transmitted concurrently to the plurality of UEs 106A, 106B, and 106C (or plurality of CPEs 107 FIG. 1B) over the plurality of beams 616A, 616B, 616C of output RF signals.

Figure 6B:
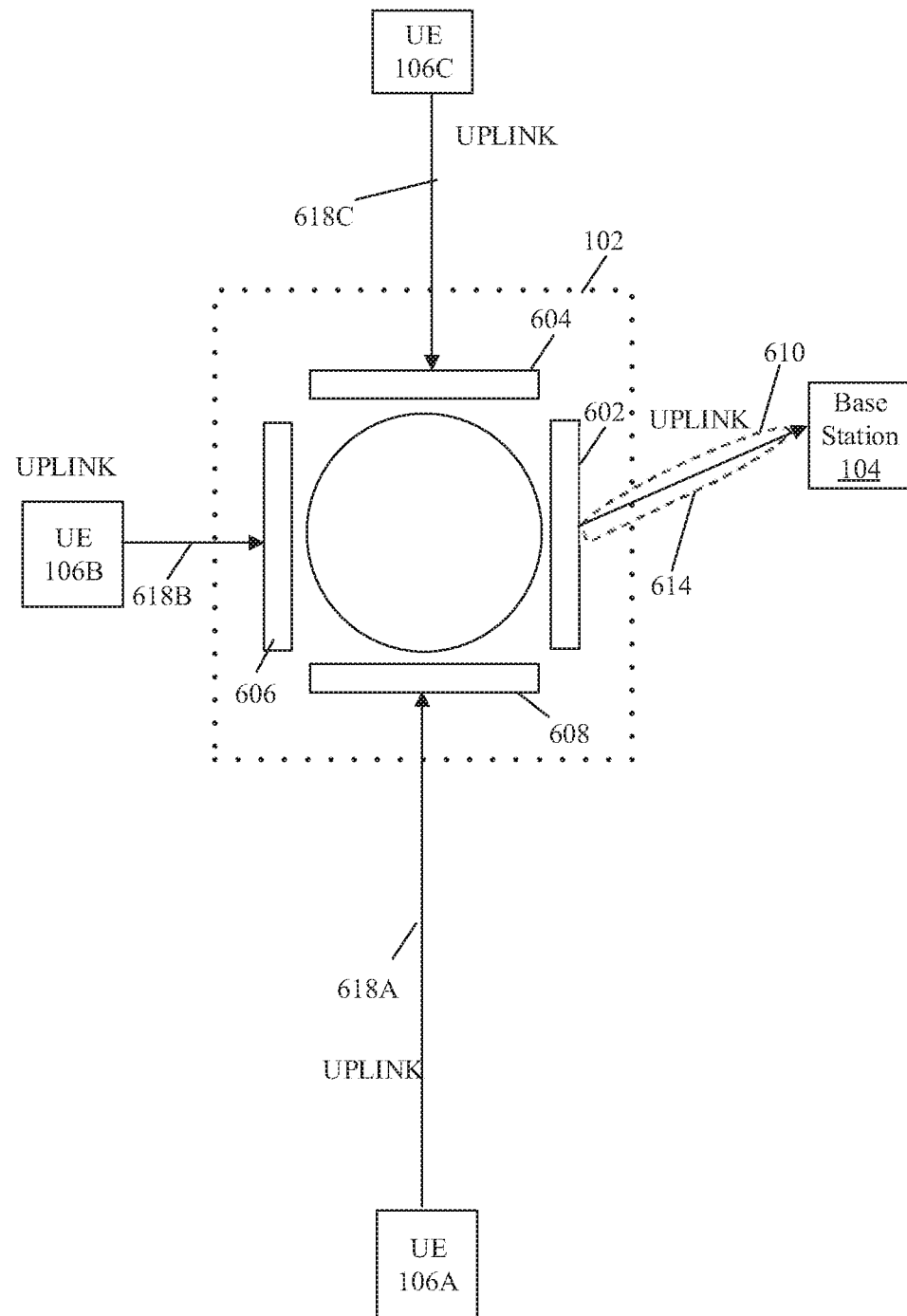
FIG. 6B illustrates a second exemplary scenario for implementation of the active repeater device, in accordance with an embodiment of the disclosure.

FIG. 6B illustrates a second exemplary scenario for implementation of the active repeater device, in accordance with an embodiment of the disclosure. The active repeater devices 102 may comprise a plurality of first antenna arrays (e.g. the first antenna array 304 in FIG. 3) and a plurality of second antenna arrays (e.g. the second antenna array 332 in FIG. 3) in primary sector 602 and the one or more secondary sectors (such as the secondary sector 604, the secondary sector 606, and the secondary sector 608). The plurality of first antenna arrays in the one or more secondary sectors 604, 606, and 608 may be configured to receive different input RF signals 618A, 618B, and 618C from the plurality of UEs 106A, 106B, and 106C (or plurality of CPEs 107 FIG. 1B) through different beam patterns and distances in an uplink communication, as shown. The received different input RF signals 618A, 618B, and 618C from the plurality of UEs 106A, 106B, and 106C may be superimposed by the primary sector 602. The primary sector 602 (e.g. the second antenna array 332 in the primary sector 602) may be configured to transmit the received different input RF signals to the base station 104 in the uplink communication as a single stream in the first beam pattern to achieve higher transmission range between the base station 104 and the active repeater device 102. The single stream may include full frequency channel that corresponds to the different input RF signals 618A, 618B, and 618C received from the plurality of UEs 106A 106B, and 106C.

Figure 6C:
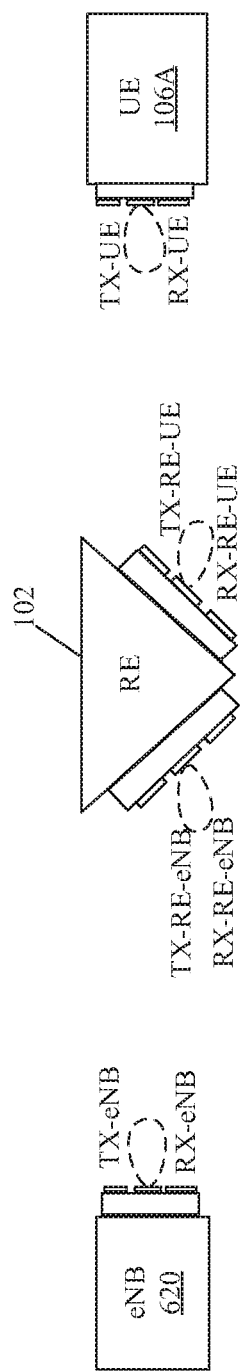
FIG. 6C illustrates an exemplary training of uplink/downlink beam patterns of an exemplary active repeater device, in accordance with an embodiment of the disclosure.

FIG. 6C illustrates an exemplary training of uplink/downlink beam patterns of an exemplary active repeater device, in accordance with an embodiment of the disclosure. With reference to FIG. 6C, there is shown the active repeater device 102, an eNB 620, and the UE 106A. The eNB 620 corresponds to the base station 104. In accordance with an embodiment, the complexity of beam search and refinement at the active repeater device 102 (also referred to as repeater equipment (RE)) may be manageable, due to the fact the beam configurations for the link between the eNB 620 and the active repeater device 102 (also represented as "RE") are static. Once the beams between the eNB 620 and the active repeater device 102 (also represented as "RE") are optimized and fine-tuned (at power up, or periodically at slow rate), there are only two beams to be optimized dynamically, namely the beams between the active repeater device 102 (also represented as "RE") and the UE 106A. This results in a beam search domain/complexity that is in the same order, if there were a direct link between the eNB 620 and the UE 106A. In FIG. 6C, the beams that are to be frequently trained and tuned, may be demonstrated. The beams corresponding to TX-eNB, RX-eNB, TX-RE-eNB, and RX-RE-eNB may require infrequent training/tuning as this link will experience infrequent changes. The only beams to be trained frequently will be TX-RE-UE, RX-RE-UE, TX-UE, and RX-UE. The same number of beams would have required frequent training if the UE 106A were connected to the eNB 620 directly.

In accordance with an embodiment, the RSSI and TSSI may be utilized by the active repeater device 102 to improve various aspects of both uplink/downlink connections. RSSI may be measured in analog domain and/or in digital domain depending on the type of implementation. RSSI measurements may be utilized for two purposes. Firstly, the RSSI is used to configure the optimal gain distribution within the receiver chain (e.g., cascading receiver chain 334). Secondly, it is used as part of transmit power control flow to adjust the transmit power of the cascading transmitter chain (e.g., the cascading transmitter chain 336). TSSI measurements may be performed by coupling onto the output of last stage power amplifiers in the transmitter chain (e.g., the cascading transmitter chain 336). TSSI is primarily used to calibrate absolute TX power levels and facilitate transmit power control (TPC) flows. Another utilization of RSSI is to adjust the relative power of signals corresponding to different UEs in uplink. Multiple-access based on Orthogonal frequency-division multiple access (OFDMA) in uplink requires careful control on relative power of signals associated with different UEs to ensure a user's adjacent leakage does not degrade the neighboring users within the same channel. This becomes particularly significant in the case of "concurrent multi-beam mode" implementation during uplink slots. In uplink time lots, different CPE signals are received through different beam patterns and/or distances. These signals are then superimposed by the repeater equipment and transported uplink to the eNB 620 (or the base station 104) as a single stream occupying the full channel. To improve and speed up the relative transmit power control procedure in uplink, the active repeater device 102 may use the RSSI measurements of signals received from different UEs to first equalize for gain differences (due to differences in distances and beam gains) before superimposing the signals and transporting them up to the eNB 620 (or the base station 104).

Figure 7A:
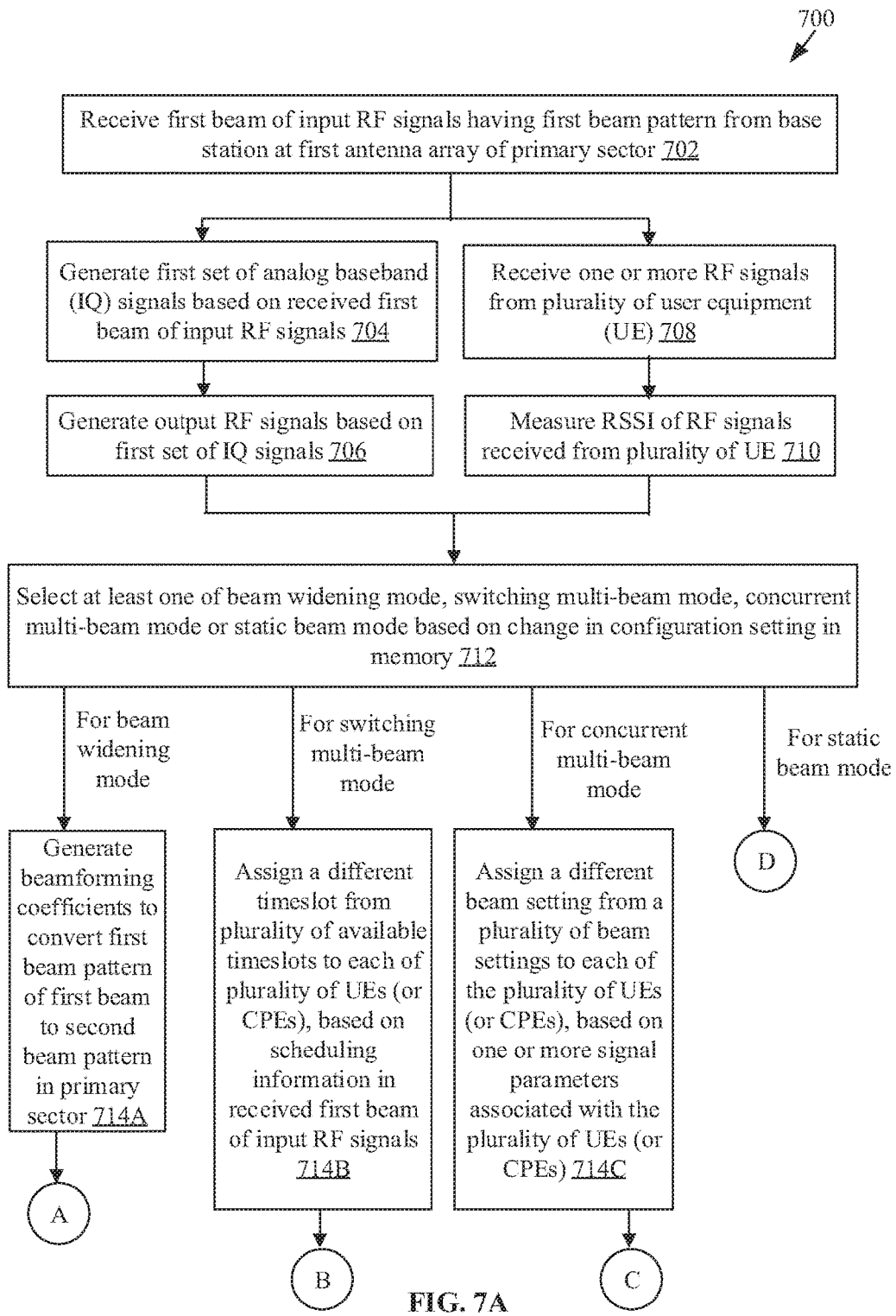
FIGS. 7A, 7B, and 7C collectively, depict a flow chart that illustrates an exemplary method of operating an exemplary active repeater device for beam widening to communicate with a plurality of user equipment, in accordance with an embodiment of the disclosure.
Figure 7B:
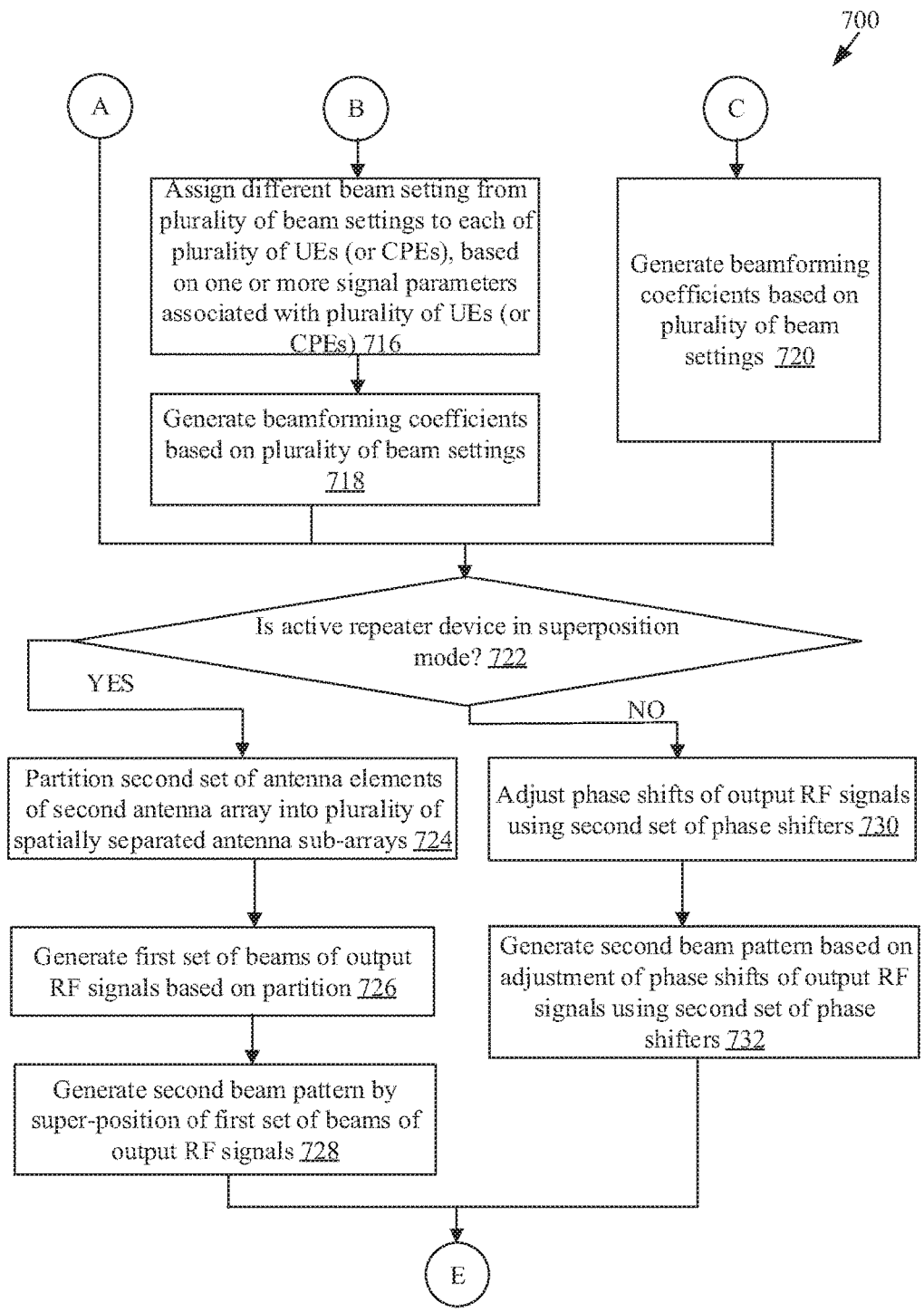
Figure 7C:
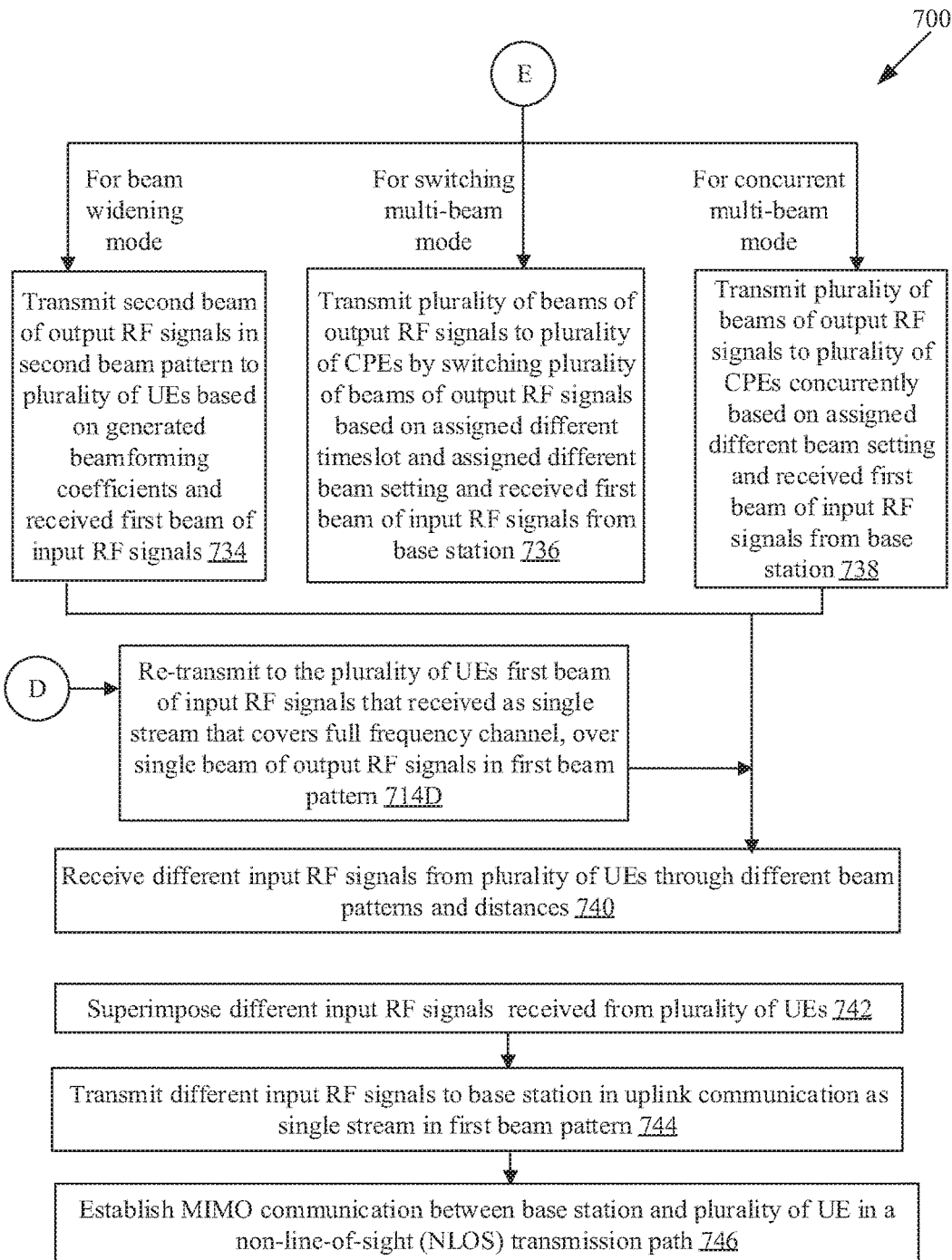

FIGS. 7A, 7B, and 7C, collectively, depict a flow chart that illustrates an exemplary method of operating an active repeater device, in accordance with an embodiment of the disclosure. With reference to FIG. 7A, there is shown a flow chart 700. The flow chart 700 is described in conjunction with FIGS. 1, 2A, 2B, 2C, 3, 4, 5A to 5D, 6A, and 6B. Referring to FIG. 7A, there is shown a flow chart 700 comprising exemplary operations 702 through 746.

At 702, the first beam of input RF signals having the first beam pattern 610 may be received from the base station 104 at a first antenna array (e.g. the first antenna array 304 of the first RH unit 204) of the primary sector 202. One or more operations 704 and 706 may be executed concurrently to one or more operations 708 and 710, as shown. Therefore, the control may pass concurrently to 704 and 708.

At 704, the first set of analog baseband (IQ) signals may be generated based on the received first beam of input RF signals. The first RH unit 204 in the primary sector 202 may be configured to generate the first set of IQ signals. The first RH unit 204 may down convert the input RF signal to generate the first set of IQ signals. The first set of IQ signals may be received by the baseband signal processor 206 in the primary sector 202. The first set of IQ signals received from the first RH unit 204 may be converted to a first set of coded data signals by the baseband signal processor 206. The baseband signal processor 206 unit may be configured to convert the first set of coded data signals to the second set of IQ signals using the first set of DACs 414.

At 706, one or more output RF signals may be generated based on the first set of IQ signals. The one or more output RF signals may be generated by a second RH unit (such as the second RH unit 210 and the second RH unit 214). The second RH unit may be configured to up convert the second set of IQ signals to generate the one or more output RF signals.

At 708, one or more RF signals may be received by the active repeater device 102 from the plurality of UEs 106A and 106B. The active repeater device 102 may be configured to receive different input RF signals from the plurality of UEs 106A and 106B through different beam patterns and distances.

At 710, RSSI of the one or more RF signals received from each of the plurality of UEs 106A and 106B may be measured in digital domain. The baseband signal processor 206 may be configured to measure the RSSI in digital domain using the second controller 404. Further, the second controller 404 may be configured to detect a location of each of the plurality of UEs 106A and 106B (or the plurality of CPEs 107) based on the measured RSSI.

At 712, at least one of the static beam mode, the beam widening mode, the switching multi-beam mode, or the concurrent multi-beam mode, may be selected. In some embodiments, one or more specified combination of the static beam mode, the beam widening mode, the switching multi-beam mode, and the concurrent multi-beam mode may be configured and set in the active repeater device 102. For example, an operating mode may be a combination of the beam widening mode and the switching multi-beam mode, where the beams that are switched are wider beams in comparison to the beam received from the base station 104. The selection may be made based on a change in the configuration setting in the memory 406. The selection may be made by at least one of a control command received from a control server (or the base station 104 from a remote location that is different than an installation location of the active repeater device, a user-input to change the configuration setting at the active repeater device, or an automatic estimation of a number, distances, and a spatial distribution of the plurality of UEs 106A, 106B, 106C (or the plurality of CPEs 107) to be serviced.

In a case where the beam widening mode is set (or selected), the control may pass to 714A and then move to 722 (FIG. 7B). In a case where the switching multi-beam mode is set (or selected), the control may pass to 714B and then move to 716 (of FIG. 7B). In a case where the concurrent multi-beam mode is set (or selected), the control may pass to 714C and then move to 720 (FIG. 7B). In a case where the static beam mode is set (or selected), the control may pass to 714D (of FIG. 7C).

At 714A, beamforming coefficients may be generated to convert first beam pattern of the first beam to the second beam pattern 612. The second controller 404 in the baseband signal processor 206 may be configured to generate the beamforming coefficients based on the detected location of each of the plurality of UEs 106A and 106B. A second beam having the second beam pattern may be wider than the first beam having the first beam pattern. The second beam having the second beam pattern may cover a second geographical area. The second geographical area may be larger than a first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B to save communication bandwidth. Therefore, the active repeater device 102 may be configured to convert a narrow beam or a pencil-beam (such as the first beam having the first beam pattern) into a widened beam (such as the second beam having the second beam pattern). The control may then pass to 722.

At 714B, a different timeslot from a plurality of available timeslots may be assigned to each of the plurality of UEs 106A, 106B, and 106C (FIG. 6A) (or the plurality of CPEs 107), based on the scheduling information extracted from the received first beam of input RF signals. The second controller 404 may be configured to assign the different timeslot to each of the plurality of UEs 106A, 106B, and 106C (or the plurality of CPEs 107). For example, a first timeslot "Ts1", a second timeslot "Ts2", a third timeslot "Ts3", and a fourth time slot "Ts4" of the plurality of available timeslots, which may be assigned to the plurality of CPEs 107 has been discussed in detail, for example, in FIGS. 1C and 1D. Each CPE of the plurality of CPE 107 may be configured to communicate with the active repeater device 102 exclusively during a corresponding timeslot assigned to the respective CPE (or UE), and may not communicate with the active repeater device 102 at other timeslots.

At 716, a different beam setting from the plurality of beam settings may be assigned to each of the plurality of UEs 106A, 106B, and 106C (or the plurality of CPEs 107), based on the one or more signal parameters associated with the plurality of UEs 106A, 106B, and 106C (or the plurality of CPEs 107). The second controller 404 may be configured to assign the different beam setting for each of the plurality of UEs 106A, 106B, and 106C (or the plurality of CPEs 107). For example, a first beam setting, a second beam setting, and a third beam setting, of the plurality of beam settings, may be assigned to the UE 106A, the UE 106B, the UE 106C respectively.

At 718, beamforming coefficients may be generated based on the plurality of beam settings. The second controller 404 in the baseband signal processor 206 may be configured to generate the beamforming coefficients based on the detected location of each of the plurality of UEs 106A, 106B, and 106C (or the plurality of CPEs 107). The control may then pass to 722.

At 714C, a different beam setting from the plurality of beam settings may be assigned to each of the plurality of UEs 106A, 106B, and 106C (or the plurality of CPEs 107), based on the one or more signal parameters associated with the plurality of UEs 106A, 106B, and 106C (or the plurality of CPEs 107). Each of the plurality of beam settings may correspond to a different beam profile of the plurality of beams 110 which may be generated by a second antenna array of a second RH unit of the active repeater device 102. Each of the plurality of beam settings comprises a set of beamforming coefficients. In accordance with an embodiment, the active repeater device 102 may be configured to assign a first set of beam settings (comprising a first beam setting, a second beam setting, and a third beam setting) to the plurality of UEs 106A, 106B, and 106C (or the plurality of CPEs 107). For example, the first beam setting, the second beam setting, the third beam setting, and the fourth beam setting of the plurality of beam settings, may be assigned to the first CPE 107A, the second CPE 107B, the third CPE 107C, and the fourth CPE 107D of the plurality of CPEs 107 respectively (FIG. 1B). In accordance with an embodiment, the active repeater device 102 may be configured to transmit the plurality of beams 110 of output RF signals during a plurality of available timeslots of a particular transmission time period. The active repeater device 102 may be configured to assign a different set of beam settings (such as the first set of beam settings) to the plurality of UEs 106A, 106B, and 106C (or the plurality of CPEs 107) for each of the plurality of available timeslots. For example, at a first timeslot "Ts1" of the plurality of available timeslots, the one or more second antenna arrays may be configured to transmit the plurality of beams 110 of output RF signals based on the first set of beam settings. Similarly, the one or more second antenna arrays may be configured to transmit the plurality of beams 110 of output RF signals at a second timeslot "Ts2", a third timeslot "Ts3", a fourth timeslot "Ts4", and a fifth timeslot "Ts5", based on a second set of beam settings, a third set of beam settings, a fourth set of beam settings, and a fifth set of beam settings respectively.

At 720, beamforming coefficients may be generated based on the plurality of beam settings. The second controller 404 in the baseband signal processor 206 may be configured to generate the beamforming coefficients based on the detected location of each of the plurality of UEs 106A, 106B, and 106C (or the plurality of CPEs 107). The control may then pass to 722.

At 722, a beamforming mode of the active repeater device 102 may be checked. The beamforming mode of the active repeater device 102 may be checked by the second controller 404. In cases where the beamforming mode is a superposition mode, the control passes to 724. In cases where the beamforming mode is a phase-only excitation mode, the control passes to 730.

At 724, the second set of antenna elements of the second antenna array 332 may be partitioned into a plurality of spatially separated antenna sub-arrays. The second controller 404 of the baseband signal processor 206 may partition the second antenna array 332 into the plurality of spatially separated antenna sub-arrays. In one example, the second set of antenna elements may comprise 256 elements. Further each of the plurality of spatially separated antenna sub-arrays may comprise 64 elements each. An example of the partitioning is shown in FIG. 5A.

At 726, the first set of beams of RF output signals may be generated based on the partition. The second antenna array (e.g. the second antenna array 332) of the first RH unit 204, the second RH unit 210 or the second RH unit 214 may be configured to generate the first set of beams of RF output signals. Each of the first set of beams may be generated by a corresponding antenna sub-array in the plurality of spatially separated antenna sub-arrays. An example of the first set of beams of RF output signals by partitioning is shown in FIG. 5B.

At 728, the second beam pattern 612 may be generated based on superposition of the first set of beams of RF output signals. An example of the generation of the second beam pattern 612 by superposition of the first set of beams of RF output signals is shown in FIG. 5B, and described in FIGS. 1, 3, and 4.

At 730, phase shifts of the output RF signals may be adjusted. A first controller (e.g. the first controller 322) of the first RH unit 204, the second RH unit 210 or the second RH unit 214 may be configured to adjust phase shifts of the output RF signals using the second set of phase shifters (e.g. the second set of phase shifters 328) of the second RH unit 210 or the second RH unit 214. In certain scenarios, phase shifts of output RF signals may be adjusted based on a quadratic phase distribution scheme. Further, the phase shifts of the output RF signals may be adjusted based on the generated beamforming coefficients.

At 732, the second beam pattern 612 may be generated based on the adjustment of phase shifts of the output RF signals. The second antenna array (e.g. the second antenna array 332) in the one or more secondary sectors (such as the secondary sector 208, 212, 604, 606, or 608) may be configured to generate the second beam pattern 612. The second beam pattern 612 may be generated by the cascading transmitter chain (e.g., the cascading transmitter chain 336) in the one or more secondary sectors (such as the secondary sector 208, and the secondary sector 212).

At 734, for the beam widening mode, the second beam of the output RF signals may be transmitted in the second beam pattern 612 to the plurality of UEs 106A, 106B, and 106C. The second antenna array (e.g. the second antenna array 332) in the one or more secondary sectors (such as the secondary sector 208, and the secondary sector 212) may be configured to generate the second beam in the second beam pattern 612 based on the generated beamforming coefficients and the received first beam of input RF signals. The second beam pattern 612 may be wider than the first beam pattern 610 and may cover a second geographical area greater than the first geographical area.

At 736, for the switching multi-beam mode, the plurality of beams of output RF signals may be transmitted to the plurality of UEs 106A, 106B, and 106C (or the plurality of CPEs 107) by switching the plurality of beams 110 of output RF signals based on the assigned different timeslot and the assigned different beam setting to each of the plurality of UEs 106A, 106B, and 106C (or the plurality of CPEs 107), and the received first beam of input RF signals from the base station 104. The second antenna array (e.g. the second antenna array 332) in the one or more secondary sectors (such as the secondary sector 208, and the secondary sector 212) may be configured to generate each beam of the plurality of beams 110 in the second beam pattern 612 based on the generated beamforming coefficients and the received first beam of input RF signals.

At 738, for the concurrent multi-beam mode, the plurality of beams 110 of the output RF signals may be concurrently transmitted to the plurality of UEs 106A, 106B, and 106C (or the plurality of CPEs 107) based on the assigned different beam setting to each of the plurality of UEs 106A, 106B, and 106C (or the plurality of CPEs 107). The second antenna array (e.g. the second antenna array 332) in the one or more secondary sectors (such as the secondary sector 208, and the secondary sector 212) may be configured to generate each beam of the plurality of beams 110 in the second beam pattern based on the generated beamforming coefficients and the received first beam of input RF signals. The full-bandwidth signal received from the base station 104 may be re-transmitted concurrently to the plurality of UEs 106A, 106B, and 106C (or the plurality of CPEs 107) over the plurality of beams 110 of output RF signals.

At 714D, for the static single beam mode, the first beam of input RF signals that is received as a single stream covering a full frequency channel, may be re-transmitted over a single beam of output RF signals in a first beam pattern, when the single beam of output RF signals is expected or known to cover all the plurality UEs 106A, 106B, and 106C (or the plurality of CPEs 107). The control from 714D may pass to 740.

At 740, different input RF signals from the plurality of UEs 106A, 106B, and 106C (or the plurality of CPEs 107) may be received by through different beam patterns and distances. The first antenna array (e.g. the first antenna array 304) in the primary sector 202 and the one or more secondary sectors (such as the secondary sector 208, and the secondary sector 212) may be configured to receive different input RF signals from the plurality of UEs 106A, 106B, and 106C (or the plurality of CPEs 107). An example of receipt of different input RF signals 618A, 618B, and 618C from the plurality of UEs 106A, 106B, and 106C through different beam patterns and distances, is shown in FIG. 6B.

At 742, the received different input RF signals (e.g., input RF signals 618A, 618B, and 618C (FIG. 6B) from the plurality of UEs 106A, 106B, and 106C (or the plurality of CPEs 107) may be superimposed to a single stream. The primary sector 202 may be configured to superimpose the received different input RF signals as the single stream having first beam pattern 610 for uplink transmission. The single stream may include full frequency channel that corresponds to the different input RF signals received from the plurality of UEs 106A, 106B, and 106C (or the plurality of CPEs 107).

At 744, the superimposed input RF signals may be transmitted to the base station 104 in an uplink communication in the first beam pattern 610 by the second antenna array (e.g. the second antenna array 332) in the primary sector 202.

At 746, a MIMO based communication may be established between the base station 104 and the plurality of UEs 106A, 106B, and 106C (or the plurality of CPEs 107) in an NLOS transmission path. The active repeater device 102 may be configured to establish the MIMO based communication. The MIMO based communication may be established based on the receipt of the first beam of input RF signals having the first beam pattern 610 from the base station 104 and transmission of the second beam of output RF signals in the second beam pattern 612 to the plurality of the plurality of UEs 106A, 106B, and 106C (or the plurality of CPEs 107).

Various embodiments of the disclosure may provide a non-transitory computer-readable medium having stored thereon, computer implemented instruction that when executed by one or more circuits causes an active repeater device to receive, by a first antenna array in a primary sector of the active repeater device, a first beam of input RF signals having a first beam pattern from a base station. The first beam pattern may cover a first geographical area. Beamforming coefficients are generated to convert the first beam pattern of the first beam of input RF signals to a second beam pattern. A second beam of output RF signals in the second beam pattern is transmitted to a plurality of user equipment (UEs) based on the generated beamforming coefficients and the received first beam of input RF signals. The second beam pattern may be wider than the first beam pattern and covers a second geographical area greater than the first geographical area.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. An active repeater device, comprising:
    a primary sector that includes a baseband signal processor and a first radio head (RH) unit, wherein
        a first antenna array of the first RH unit is configured to receive or transmit a first beam of input RF signals having a first beam pattern from or to a base station, respectively, wherein the first beam pattern covers a first geographical area;
        a controller of the baseband signal processor is configured to generate beamforming coefficients to convert the first beam pattern of the first beam of input RF signals to a second beam pattern based on a first operating mode, of a plurality of operating modes, set in the active repeater device; and
    at least a secondary sector that is communicatively coupled to the primary sector and includes a second RH unit, wherein
        a second antenna array of the second RH unit is configured to transmit or receive a second beam of output RF signals in the second beam pattern to or from, respectively, a plurality of user equipment (UEs) based on the generated beamforming coefficients in the first operating mode and the received first beam of input RF signals, wherein the second beam pattern is wider than the first beam pattern and covers a second geographical area greater than the first geographical area, wherein the transmission or reception of the second beam of output RF signals in the second beam pattern to the plurality of user equipment (UEs) is independent of constant tracking of locations and orientations of the plurality of UEs to save communication bandwidth.

2. The active repeater device of claim 1, wherein the baseband signal processor is configured to concomitantly support multi-band millimeter wave (mm Wave) spectrum and sub-30 GHz spectrum.

3. The active repeater device of claim 1, wherein the first antenna array comprises a first set of antenna elements and the second antenna array comprises a second set of antenna elements, wherein the controller is further configured to partition the second set of antenna elements of the second antenna array into a plurality of spatially separated antenna sub-arrays.

4. The active repeater device of claim 3, wherein the second antenna array is configured to generate a first set of beams of output RF signals based on the partition, and wherein the second beam pattern is generated by superposition of the first set of beams of output RF signals with each other.

5. The active repeater device of claim 1, wherein the second RH unit further comprises a cascading transmitter chain that includes a second set of power dividers, a second set of phase shifters, a second set of power amplifiers, and a second set of antenna elements.

6. The active repeater device of claim 5, wherein the controller is further configured to adjust phase shifts of output RF signals using the second set of phase shifters to generate the second beam of output RF signals, based on a predefined criteria, wherein the generation of the second beam pattern by the second antenna array is based on the adjustment of the phase shifts of the output RF signals using the second set of phase shifters independent of changes in amplitude of the output RF signals.

7. The active repeater device of claim 5, wherein the controller is further configured to adjust phase shifts of output RF signals using the second set of phase shifters to generate the second beam of output RF signals based on a quadratic phase distribution scheme.

8. The active repeater device of claim 1, wherein a multiple-input multiple-output (MIMO) based communication is established between the base station and the plurality of user equipment (UEs) by the active repeater device in a non-line-of-sight (NLOS) transmission path based on the receipt of the first beam of input RF signals having the first beam pattern from the base station and transmission of the second beam of output RF signals in the second beam pattern to the plurality of UEs.

9. The active repeater device of claim 1, wherein the primary sector and each of one or more secondary sectors that includes the at least secondary sector of the active repeater device, after installation at a defined location, are configured to cover a portion of a 360-degree scan range for communication among the base station, the plurality of user equipment (UEs), or another active repeater device.

10. The active repeater device of claim 1, further comprises a plurality of first antenna arrays, wherein the plurality of first antenna arrays in a plurality of secondary sectors are further configured to receive different input RF signals from the plurality of user equipment (UEs) through different beam patterns and distances, wherein the received different input RF signals from the plurality of UEs are superimposed by the primary sector and transmitted to the base station in an uplink communication as a single stream in the first beam pattern, wherein the single stream includes full frequency channel that corresponds to the different input RF signals received from the plurality of UEs.

11. The active repeater device of claim 1, further comprising a memory that is configured to store a configuration setting to allow to set the first operating mode from the plurality of operating modes of the active repeater device, wherein the plurality of operating modes comprises a static beam mode, a beam widening mode, a switching multi-beam mode, a concurrent multi-beam mode, and one or more specified combination of the static beam mode, the beam widening mode, the switching multi-beam mode, and the concurrent multi-beam mode.

12. The active repeater device of claim 11, wherein the controller is further configured to select at least one of the static beam mode, the beam widening mode, the switching multi-beam mode, the concurrent multi-beam mode, or one or more specified combination of the static beam mode, the beam widening mode, the switching multi-beam mode, and the concurrent multi-beam mode based on a change in the configuration setting in the memory.

13. The active repeater device of claim 11, wherein the controller is further configured to reconfigure a beamforming function of the active repeater device to switch between the first operating mode to a second operating mode of the plurality of operating modes based on at least one of: a control command received from a control server from a remote location that is different than an installation location of the active repeater device, a user-input to change the configuration setting at the active repeater device, or an automatic estimation of a number, distances, and a spatial distribution of the plurality of user equipment (UEs) to be serviced, wherein the first operating mode corresponds to the beam widening mode.

14. The active repeater device of claim 11, wherein in the switching multi-beam mode,
    the controller is further configured to:
        assign a different timeslot from a plurality of available timeslots to each of the plurality of user equipment (UEs), based on scheduling information in the received first beam of input RF signals, and assign a different beam setting from a plurality of beam settings to each of the plurality of UEs, based on one or more signal parameters associated with the plurality of UEs; and the second antenna array of the second RH unit is configured to transmit a plurality of beams of output RF signals to the plurality of UEs by switching the plurality of beams of output RF signals based on the assigned different timeslot and the assigned different beam setting to each of the plurality of UEs, and the received first beam of input RF signals from the base station.

15. The active repeater device of claim 14, wherein the one or more signal parameters corresponds to received signal strength indicator (RSSI) associated with the plurality of UEs that indicates a location or a distance of each of the plurality of UEs from the active repeater device.

16. The active repeater device of claim 14, wherein, in the switching multi-beam mode, the second antenna array of the second RH unit is further configured to transmit a first beam of output RF signals of the plurality of beams of output RF signals to a first UE of the plurality of UEs, during a first timeslot assigned to the first UE, based a first beam setting assigned to the first UE, and based on the received first beam of input RF signals.

17. The active repeater device of claim 14, wherein each of the plurality of beam settings correspond to a different beam profile of the plurality of different beams transmitted by the second antenna array in the second RH unit.

18. The active repeater device of claim 14, wherein the received first beam of input RF signals is a single reference stream comprising scheduling information associated with a time division multiple access (TDMA) based wireless signal transmission system.

19. The active repeater device of claim 11, further comprising a plurality of second antenna arrays including the second antenna array, wherein in the concurrent multi-beam mode, the controller is further configured to:
assign a different beam setting from a plurality of beam settings to each of the plurality of UEs, based on one or more signal parameters associated with the plurality of UEs; and one or more second antenna arrays of the plurality of second antenna arrays is configured to concurrently transmit a plurality of beams of output RF signals to the plurality of UEs based on the assigned different beam setting to each of the plurality of UEs, and wherein a full-bandwidth signal received from the base station as input is re-transmitted concurrently to the plurality of UEs over the plurality of beams of output RF signals.

20. The active repeater device of claim 11, wherein in the static single beam mode, the second antenna array of the second RH unit, under the control of the controller, is further configured to re-transmit the first beam of input RF signals that is received as a single stream that covers a full frequency channel to the plurality of UEs, over a single beam of output RF signals in the first beam pattern, when the single beam of output RF signals is expected to cover all the plurality of UEs.

21. A method, comprising:
in an active repeater device comprising a primary sector that includes a baseband signal processor and a first radio head (RH) unit, and at least a secondary sector that is communicatively coupled to the primary sector and includes a second RH unit:

receiving or transmitting, by a first antenna array of the first RH unit, a first beam of input RF signals having a first beam pattern from or to a base station, respectively, wherein the first beam pattern covers a first geographical area;

generating, by a controller of the baseband signal processor, beamforming coefficients to convert the first beam pattern of the first beam of input RF signals to a second beam pattern based on a first operating mode, of a plurality of operating modes, set in the active repeater device; and transmitting or receiving, by a second antenna array of the second RH unit, a second beam of output RF signals in the second beam pattern to or from, respectively, a plurality of user equipment (UEs) in the first operating mode, based on the generated beamforming coefficients and the received first beam of input RF signals, wherein the second beam pattern is wider than the first beam pattern and covers a second geographical area greater than the first geographical area. area, wherein the transmission or reception of the second beam of output RF signals in the second beam pattern to the plurality of user equipment (UEs) is independent of constant tracking of locations and orientations of the plurality of UEs to save communication bandwidth.

22. A non-transitory computer-readable medium, having stored thereon, computer-executable code, which when executed by a computer, cause the computer to execute operations, the operations comprising:

in an active repeater device comprising a primary sector that includes a baseband signal processor and a first radio head (RH) unit, and at least a secondary sector that is communicatively coupled to the primary sector and includes a second RH unit:

receiving or transmitting, by a first antenna array of the first RH unit, a first beam of input RF signals having a first beam pattern from or to a base station, respectively, wherein the first beam pattern covers a first geographical area;

generating, by a controller of the baseband signal processor, beamforming coefficients to convert the first beam pattern of the first beam of input RF signals to a second beam pattern based on a first operating mode, of a plurality of operating modes, set in the active repeater device; and transmitting or receiving, by a second antenna array of the second RH unit, a second beam of output RF signals in the second beam pattern to or from, respectively, a plurality of user equipment (UEs) in the first operating mode, based on the generated beamforming coefficients and the received first beam of input RF signals, wherein the second beam pattern is wider than the first beam pattern and covers a second geographical area greater than the first geographical area. area, wherein the transmission or rejection of the second beam of output RF signals in the second beam pattern to the plurality of user equipment (UEs) is independent of constant tracking of locations and orientations of the plurality of UEs to save communication bandwidth.

* * * * *